United States Patent [19]

Yoshida et al.

[11] Patent Number: 5,775,289

[45] Date of Patent: Jul. 7, 1998

[54] DIRECT CYLINDER FUEL INJECTED ENGINE

[75] Inventors: Takeo Yoshida; Takahiro Suzuki, both of Iwata, Japan

[73] Assignee: Yamaha Hatsudoki Kabushiki Kaisha, Iwata, Japan

[21] Appl. No.: 645,217

[22] Filed: May 13, 1996

[30] Foreign Application Priority Data

| May 12, 1995 | [JP] | Japan | 7-138511 |
| May 15, 1995 | [JP] | Japan | 7-139983 |
| May 29, 1995 | [JP] | Japan | 7-153980 |

[51] Int. Cl.⁶ .......... F01L 11/00; F02B 33/04
[52] U.S. Cl. .......... 123/305; 123/73 C
[58] Field of Search .......... 123/299, 305, 123/73 C, 294

[56] References Cited

U.S. PATENT DOCUMENTS

| 4,790,270 | 12/1988 | McKay | 123/305 |
| 4,932,370 | 6/1990 | Schierling | 123/73 C |
| 5,062,395 | 11/1991 | Tateno | 123/73 C |
| 5,107,810 | 4/1992 | Wu . | |
| 5,237,966 | 8/1993 | Katoh | 123/73 C |
| 5,249,557 | 10/1993 | Katoh | 123/305 |
| 5,284,111 | 2/1994 | Geyer | 123/73 C |
| 5,553,579 | 9/1996 | Yoshida | 123/73 C |

FOREIGN PATENT DOCUMENTS

| 2692625 | 12/1993 | France . | |
| 1934882 | 1/1970 | Germany . | |
| 3128543 | 2/1983 | Germany . | |
| 4100086 | 7/1991 | Germany . | |
| 0063529 | 5/1977 | Japan | 123/73 C |
| 175156 | 2/1922 | United Kingdom | 123/73 C |
| 723972 | 2/1955 | United Kingdom . | |
| 2199617 | 7/1988 | United Kingdom . | |
| 2215398 | 9/1989 | United Kingdom . | |
| 8700575 | 1/1987 | WIPO . | |

*Primary Examiner*—Carl S. Miller
*Attorney, Agent, or Firm*—Knobbe,Martens, Olson & Bear LLP

[57] ABSTRACT

A number of embodiments of engines having direct cylinder injection wherein the fuel injector is positioned so as to be shrouded by the piston during at least a portion of its stroke. This permits the use of less expensive and lower pressure fuel injection nozzles. The spray pattern of the injector is chosen so that some fuel is sprayed toward the spark plug to provide stratification, but the major portion is directed toward the head of the piston so to as insure a homogeneous mixture when operating at high speed, high load conditions.

35 Claims, 30 Drawing Sheets

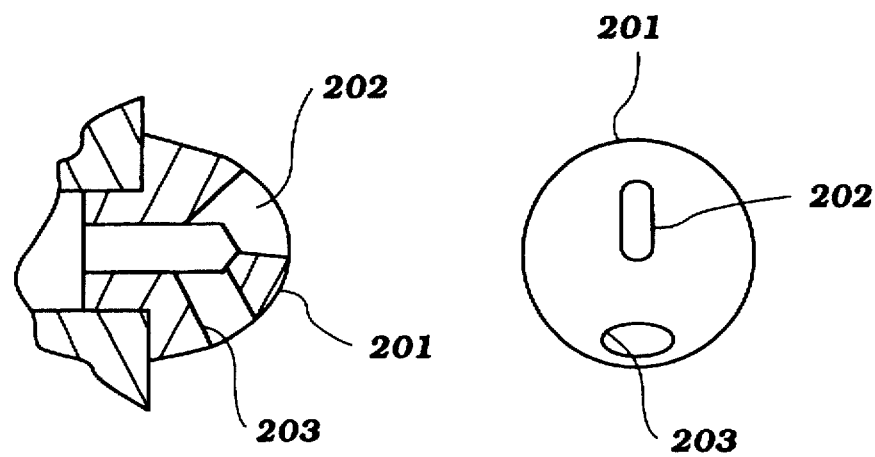
*Figure 17*  *Figure 18*
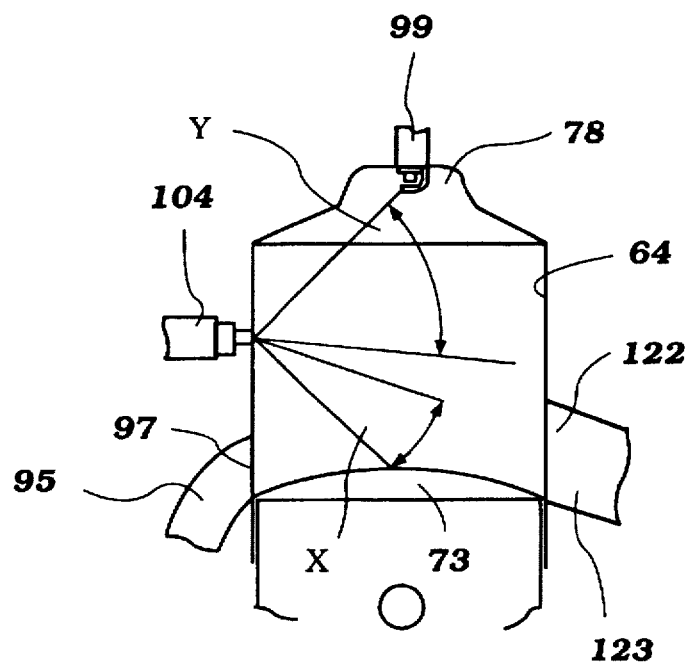
*Figure 19*

DIRECT CYLINDER FUEL INJECTED ENGINE

BACKGROUND OF THE INVENTION

This invention relates to a direct cylinder fuel-injected engine and more particularly to an improved injection nozzle arrangement and configuration for such engines.

In the interest of improving engine performance and particularly fuel economy and exhaust emission control, the utilization of fuel injection offers a number of advantages. It has been generally the practice to employ manifold-type fuel injection systems because of their simplicity and the fact that they permit the use of lower cost fuel injectors.

Although direct cylinder injection has a number of advantages over manifold injection, the hostile environment in the combustion chamber at the time of combustion necessitates very high cost fuel injection systems and particularly the fuel injector which itself is exposed in the combustion chamber.

A type of direct fuel injection system has been proposed, however, where the fuel injector is mounted in the cylinder block and projects so that its spray axis extends through one of the cylinder bores rather than the more conventional mounting in the cylinder head. By mounting the fuel injector so that it is shrouded at times by the piston, it is possible to utilize lower cost fuel injectors than those which are mounted in the cylinder head. Because the piston shrouds the fuel injector during at least a portion of the combustion cycle, the fuel injector need not be capable of withstanding the same combustion conditions as cylinder head mounted fuel injectors.

There are, however, a number of difficulties that are presented by such cylinder block mounting of the fuel injector. First of these has to do with the amount of fuel which can be injected into the combustion chamber. Since the fuel injector is shrouded by the piston during at least a portion of the stroke, the amount of time available for fuel injection is substantially less than if the injector were mounted in the cylinder head. This may decrease the maximum output which can be obtained from the engine.

Although the amount of fuel injected can be increased by either increasing the pressure of injection or by increasing the number of injection nozzles, both expedients tend to offset the advantages of this type of injector mounting. That is, if the injection pressure becomes higher, then the cost of the injector goes up. Also, multiple injectors are obviously more expensive than single injectors.

It is, therefore, a principle object of this invention to provide an improved mounting arrangement for an in-cylinder fuel injector wherein the injector is protected from the combustion process adequately but wherein the injector is exposed to the combustion chamber for a long enough time period that adequate fuel can be injected under all running conditions without resorting to high-pressure fuel injectors.

It is a still further object of this invention to provide an improved direct cylinder injected engine having a fuel injector mounted in the cylinder bore.

Another problem attendant with the in-cylinder injector mounting is that the spray axis extends generally transversely to the cylinder bore axis. When the fuel injector is mounted in the cylinder head, its spray axis can be directed more along the cylinder bore axis and it is easier to achieve a homogeneous mixture in the combustion chamber, as is required when operating at high-speed and high-load conditions. However, this problem becomes more severe when the injector sprays transversely to the cylinder bore axis as is generally required by cylinder block injection mounting locations.

This is also another reason why too high a pressure of injection is not desirable with this type of mounting. If the injection pressure is too high, the fuel may be deposited on the opposing cylinder bore wall and be shrouded by the piston so as to preclude combustion of the deposited fuel. Also, if the engine is a two-cycle ported engine, then there becomes a risk that some of the fuel will be sprayed out of the exhaust port.

It is, therefore, a still further object of this invention to provide an improved fuel injector arrangement for an in-cylinder, cylinder block mounted fuel injector.

It is another object of this invention to provide an in-cylinder mounted fuel injector that sprays transversely to the cylinder bore axis but which can provide the necessary spray pattern to ensure a homogeneous mixture in the combustion chamber when required.

Although a homogeneous mixture is desirable in the combustion chamber particularly at high-speed and high-load conditions, a homogeneous mixture may not be the most optimum condition under other engine loads. That is, when operating at low-and mid-range, it is desirable, if possible, to obtain some form of stratification in the combustion chamber. If a rich fuel mixture can be maintained in the area of the spark plug at the time of firing, then the entire cylinder need not be charged with a homogeneous mixture to ensure complete combustion. This will offer advantages of fuel economy. However, such mixture distributions are difficult to obtain with conventional in-cylinder mounted fuel injectors.

It is, therefore, a still further object of this invention to provide an improved in-cylinder mounted fuel injector that will achieve a spray pattern that can provide homogeneous mixtures at high-speed and high-loads and also stratified mixtures under other running conditions while still ensuring complete combustion.

SUMMARY OF THE INVENTION

A first feature of this invention is adapted to be embodied in a direct cylinder injected internal combustion engine that is comprised of a cylinder block having a cylinder bore extending from an upper peripheral edge closed by a cylinder head. A piston reciprocates in the cylinder bore between a bottom dead center (BDC) position and a top dead center (TDC) position and forms with the cylinder bore and the cylinder head a variable volume chamber. The piston has a piston head which faces the cylinder head. The piston head is disposed at a distance L below the upper peripheral edge of the cylinder block when at its BDC position. The piston head is also formed with at least an upper ring groove which extends circumferentially therearound and which receives a piston ring for sealing with the cylinder bore. The ring groove is disposed at a distance RS from the upper peripheral edge of the piston head. A fuel injector is supported within the cylinder block and has a nozzle spray axis that enters into the cylinder bore in a generally transverse direction. The spray axis intersects the cylinder bore at the point where it discharges at a distance A from the upper peripheral edge of the cylinder block and such that the spray axis is covered by the piston during at least a portion of its stroke. The following relationship holds true: RS<A<0.3L.

Another feature of the invention is adapted to be embodied in a direct cylinder injected internal combustion engine that has a cylinder block that defines a cylinder bore extending from an upper peripheral edge closed by a cylinder head. A piston reciprocates in the cylinder bore between the bottom dead center (BDC) position and a top dead center (TDC) position and forms with the cylinder bore and the cylinder head a variable volume combustion chamber. A fuel injector is supported within the cylinder block and has a nozzle spray axis that extends into the cylinder bore and which sprays transversely therein relative to the cylinder bore axis. The spray nozzle is configured to direct a portion of the flow therefrom down toward the head of the piston when the spray nozzle is uncovered and another portion that is directed generally upwardly toward the cylinder head. The greater proportion of the spray from the injector nozzle is directed downwardly rather than upwardly.

A still further feature of the invention is also adapted to be embodied in a direct cylinder injected internal combustion engine that has a cylinder block that defines a cylinder bore extending from an upper peripheral edge closed by a cylinder head. A piston reciprocates in the cylinder bore between the bottom dead center (BDC) position and a top dead center (TDC) position and forms with the cylinder bore and the cylinder head a variable volume combustion chamber. A fuel injector is supported within the cylinder block and has a nozzle spray axis that extends into the cylinder bore and which sprays transversely therein relative to the cylinder bore axis. In accordance with this feature of the invention, the nozzle spray axis defines a spray pattern that extends not less than 45° around the spray axis in the direction of the cylinder bore axis.

BRIEF DESCRIPTION OF THE DRAWINGS

FIG. 17 is a cross-sectional view, in part similar to FIG. 9 but on a smaller scale and shows another embodiment of fuel injection nozzle spray arrangement.

FIG. 18 is a view in part similar to FIG. 10 but of the injection nozzle of FIG. 17 and looking in the direction of the arrow 18 in FIG. 17.

FIG. 19 is a partially schematic cross-sectional view showing how this spray nozzle pattern relates to the other components of the engine.

DETAILED DESCRIPTION OF THE PREFERRED EMBODIMENTS OF THE INVENTION

Figure 1:
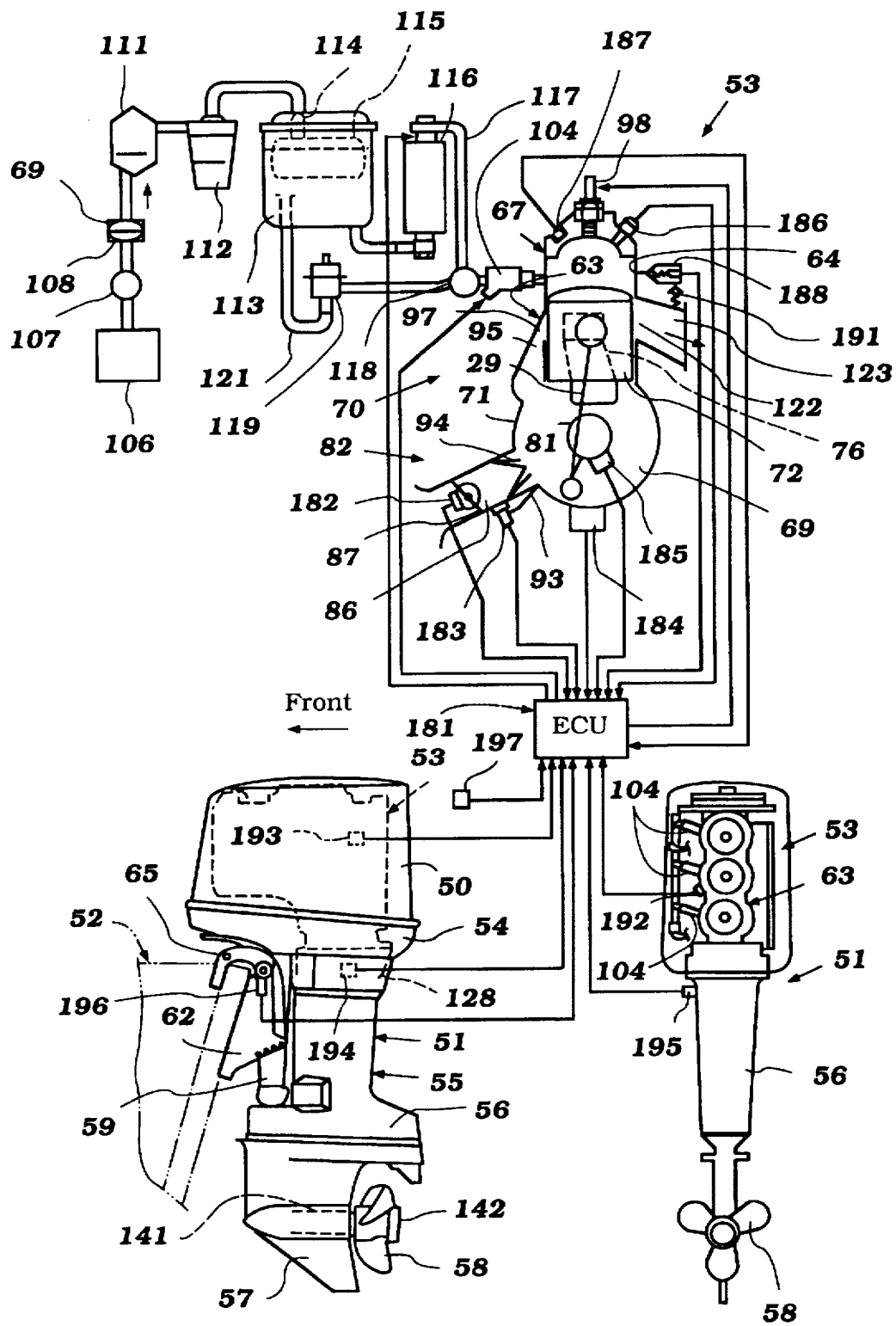
FIG. 1 is a multipart view showing, in the lower left-hand corner thereof, an outboard motor constructed and operated in accordance with an embodiment of the invention as attached to the transom of an associated watercraft which is shown partially and in phantom; at the lower right hand side, a rear elevational view of the outboard motor with a portion of the protective cowling removed; and in the upper view, a top cross-sectional view taken through the engine and showing the engine in part schematically along with the components of the fuel injection and control system for the engine.

Referring now to the first embodiment, which is shown in FIGS. 1–16, this embodiment will be described first by reference particularly to FIGS. 1 and 2. This embodiment is adapted to be utilized in conjunction with an outboard motor, which is indicated generally by the reference numeral 51 and which is shown as attached to the transom of a watercraft, which watercraft is indicated generally by the reference numeral 52 but which is shown in phantom. The invention is described in conjunction with an outboard motor because certain facets of it have particular application to two-cycle crankcase compression internal combustion engines. Such engines are frequently employed as the power plants for outboard motors, but as will be apparent by reference to other embodiments, the invention may be utilized in conjunction with applications for two-cycle engines other than outboard motors.

Also and as will also become apparent by reference to additional embodiments, the invention is not limited to its applicability to two-cycle engines. Although the invention has particular utility with two-cycle engines because of the emission control problems particularly peculiar to these engines due to the scavenging cycle, the invention also may be utilized with four-cycle engines. Such an embodiment will be described later.

Although the invention deals primarily with the engine and its control system, the total environment will be described by continuing reference to FIGS. 1 and 2. The outboard motor 51 includes a power head that includes a powering internal combustion engine 53. In the illustrated embodiment and as has been noted, the engine 53 is a two-cycle, crankcase compression engine. Also, in the illustrated embodiment the engine 53 is of the three cylinder, in-line type. For the reasons already noted, it will be apparent to those skilled in the art how the invention can be utilized with other types of engines and engines having other configurations.

In addition to the engine 53, the power head includes a protective cowling that is comprised of a lower tray portion 54 to which a detachable main cover portion 50 is connected in a known manner. This power head is formed at the upper end of a drive shaft housing 55. The drive shaft housing 55 includes an outer casing 56 which includes certain components, some of which will be described. In addition, a drive shaft which is driven by the engine output shaft is journaled in the drive shaft housing 55 and depends into a lower unit 57. A propeller 58 is fixed on a propeller shaft driven by a transmission in the lower unit 57 for powering the associated watercraft 52.

A steering shaft (not shown) is affixed to the outer casing 56 of the drive shaft housing 55. This steering shaft is journaled in a swivel bracket 59 for steering of the outboard motor 51 about a generally vertically extending steering axis in a manner well known in this art. In addition, the swivel bracket 59 is pivotally connected by a trim pin 61 to a clamping bracket 62. This pivotal connection permits tilt and trim movement of the outboard motor 51 in a manner well known in this art. As has been noted, the construction of the outboard motor 51 has been described primarily to permit those skilled in the art to understand an environment in which the invention may be utilized. Since the invention deals with the engine 53, and primarily with its fuel injection system, and injector and injector location, further description of the outboard motor, except for components which are associated more directly with the engine 53, will not be made. Those skilled in the art can refer to any known constructions for features of outboard motors with which the invention can be practiced.

The engine 53 will now be described in more detail by continuing reference to FIG. 1, and to FIGS. 3–5 and 7. The engine 53 includes a cylinder block assembly, indicated generally by the reference numeral 63, in which three aligned vertically spaced cylinder bores 64 are formed by pressed or cast-in cylinder liners 65. It should be readily apparent, however, that the invention may be practiced with engines wherein the cylinder bores are formed directly in the material of the cylinder block 63, or by plated liners formed therein.

The cylinder bores 64 extend upwardly and terminates at an upper surface 66 of the cylinder block 63. Actually, the engine is oriented so that the cylinder block surface 66 is at one end of the engine.

A cylinder head assembly, indicated generally by the reference numeral 67, is affixed to the cylinder block 63 in any known manner. The cylinder head assembly is in sealing relation with the block surface 66. The cylinder head 67 is provided with individual recesses 68 which form a portion of the combustion chambers of the engine for each cylinder, as will become apparent.

The end of the cylinder bores 64 opposite to the cylinder head 67 forms a crankcase chamber 69. This crankcase chamber 69 is formed by a skirt of the cylinder block 63 and a crankcase member 71 that is detachably affixed thereto in a known manner. In accordance with typical two-cycle engine practice, the crankcase chamber 69 associated with each of the cylinder bores 64 are sealed relative to each other so as to permit the induction of a charge thereto.

Pistons 72 are slidably supported in each of the cylinder bores 64. The pistons 72 have head portions 73 that are formed with upper and lower piston ring grooves 74 and 75 in which respective piston rings 76 and 77 are received. As is well known in this art, the piston rings 76 and 77 form a sealing function between the pistons 72 and the cylinder bore 64 so as to complete the formation of the combustion chamber. Since at top dead center position, the combustion chamber is formed primarily by the cylinder head recess 68, at times this reference numeral will also be used to refer to the combustion chamber of the engine.

The pistons 72 are each connected by means of a piston pin 78 to the small end of a connecting rod 79. Each connecting rod 79 is journaled on a respective throw of a crankshaft 81. As is typical with two-cycle engine practice, the crankshaft 81 rotates about a vertically extending axis so as to facilitate its connection to the drive shaft afore referred to.

In view of the fact that the engine 53 in the illustrated embodiment is of the three cylinder type, in order to provide equal firing intervals, the throws of the crankshaft 81 associated with each of the connecting rods 79 are offset from each other by 120°. Of course, other arrangements also may be employed.

An induction system, indicated generally by the reference numeral 82, is provided for delivering an air charge to the crankcase chamber 69 as the pistons 71 move upwardly during their stroke. As will be seen in FIG. 3, where the piston 72 is shown approximately midway in its stroke, the piston moves from a bottom dead center position, wherein the head 73 is spaced a distance L from the upper end of the cylinder bore 64 in the cylinder head surface 68. At its top dead center position, as will be described later, the piston is disposed so that the head 73 substantially coincides with the surface 66. The position of the piston rings 76 and 77 in this top dead center (TDC) position are shown in phantom lines in this figure. In this position, the lowermost portion of the uppermost piston groove 74 is disposed at a distance RS below the cylinder block upper surface 66.

Figure 7:
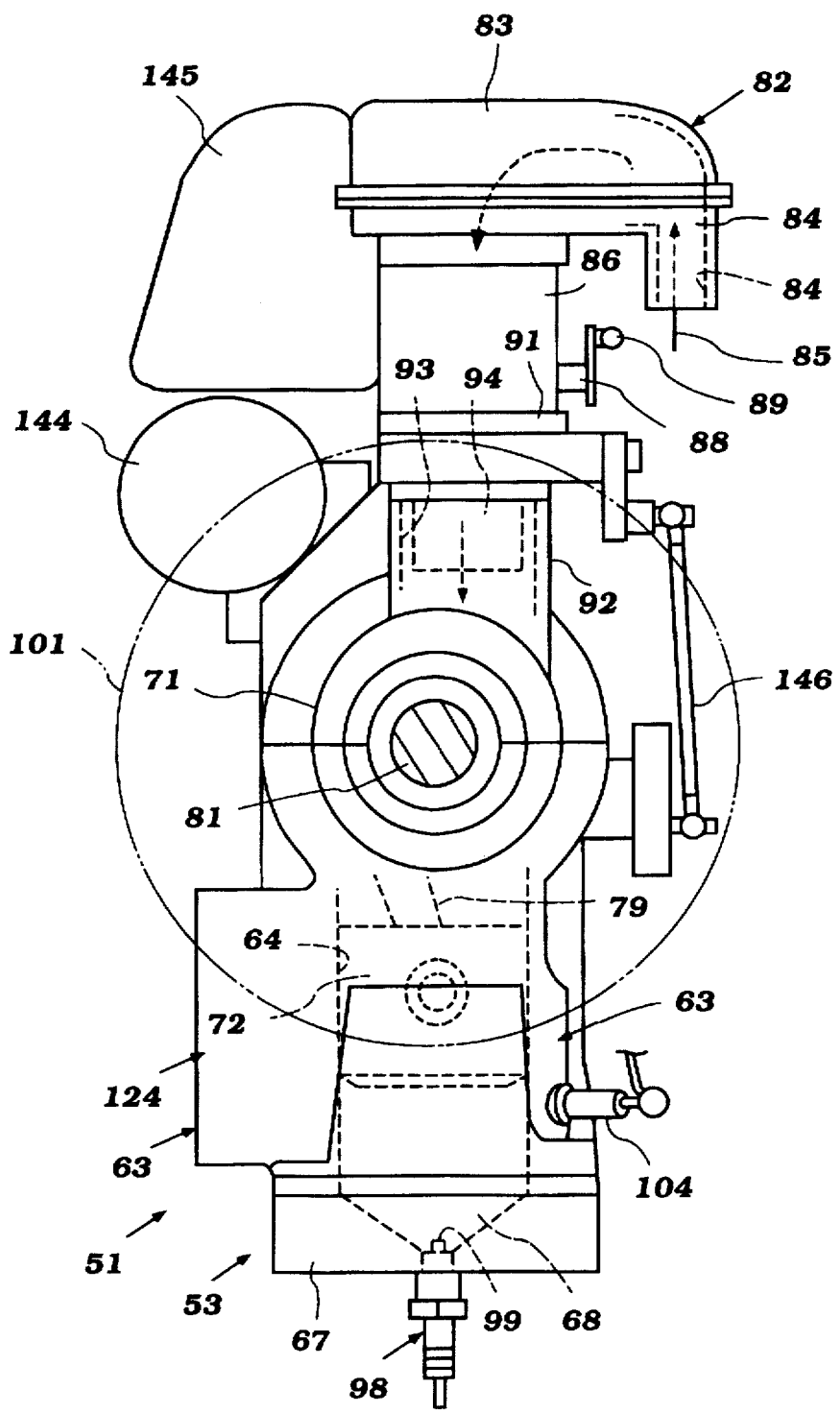
FIG. 7 is a top plan view of the engine of the outboard motor with the protective cowling removed and other portions shown in phantom.

The induction system 82 may be seen best in FIGS. 1 and 7, and it includes a silencing air inlet device 83 having one or more atmospheric air inlet openings 84 that receive air flowing in the direction indicated by the arrow 85. This air flow is admitted into the protective cowling by one or more air inlet openings formed in the main cowling member 50, as is well known in this art and which are illustrated schematically in FIG. 2.

The inducted air passes into throttle bodies, indicated generally by the reference numeral 86, in which a butterfly-type throttle valves, indicated generally by the reference numeral 87 and shown in FIG. 1, are positioned. Each crankcase chamber 69 is provided with a respective throttle body 86 and throttle valve 87. These throttle valves all are positioned on respective throttle valve shafts 88 that have link arms 89 at the end thereof for connection to an appropriate linkage system for controlling the speed of the engine, as is well known in this art.

The throttle bodies 86 have flange portions 91 that are connected to intake manifolds 92 which communicate with intake ports 93 formed in the crankcase member 71 for delivery of the air charge to the crankcase chamber 69. A reed-type check valve 94 is provided in each of the intake ports 93 so as to permit the air charge to be inducted into the crankcase chambers 69 when the pistons 72 are on their up or intake stroke. However, when the pistons 72 move downwardly to compress the charge in the crankcase chamber 69, the reed-type check valves 94 will close and preclude reverse flow.

The charge which has been compressed in the crankcase chambers is then transferred to the combustion chambers 68 through a scavenging system, indicated generally by the reference numeral 70. This scavenging system 70 includes a center scavenging passage 95 (see FIG. 5) and a pair of side scavenging passages 96, which are disposed on opposite sides thereof. These scavenge passages 95 and 96 communicate with the combustion chamber 68 during a portion of the stroke of the piston through respective scavenge ports 97.

A spark plug 98 is mounted in the cylinder head 67 for each combustion chamber recess 68. The spark plugs 98 have their spark gaps 99 disposed substantially at the center of the recesses 68.

A flywheel magneto assembly, indicated generally by the reference numeral 101, is connected to the upper end of the crankshaft 81 by means of a key and nut 102 so as to generate electrical power for firing of the spark plugs 98 and providing other electrical power for the engine.

A fuel supply charge forming system is provided for supplying fuel to the combustion chamber recesses 68 for firing by the spark plugs 98. This fuel supply system will be described by primary reference to FIGS. 1 and 2, with this latter figure showing also certain components of the air induction system already described in a schematic fashion. Reference has been made to the atmospheric air inlet in the protective cowling, and this is shown schematically in FIG. 2, and is identified generally by the reference numeral 103.

The fuel supply or charge forming system includes fuel injectors, indicated generally by the reference numeral 104, and which have a preferred construction in accordance with any one of the embodiments which will be later described. Each fuel injector 104 is mounted so that its spray port aligns with an opening 105 in the cylinder bore 64, and specifically the liner 65, so that the injector axis "x" lies on a line that is generally perpendicular to the axis of the cylinder bore 64 and which is spaced at a distance A below the upper cylinder head surface 66. The spray relationship will be described later.

Figures 4, 5:
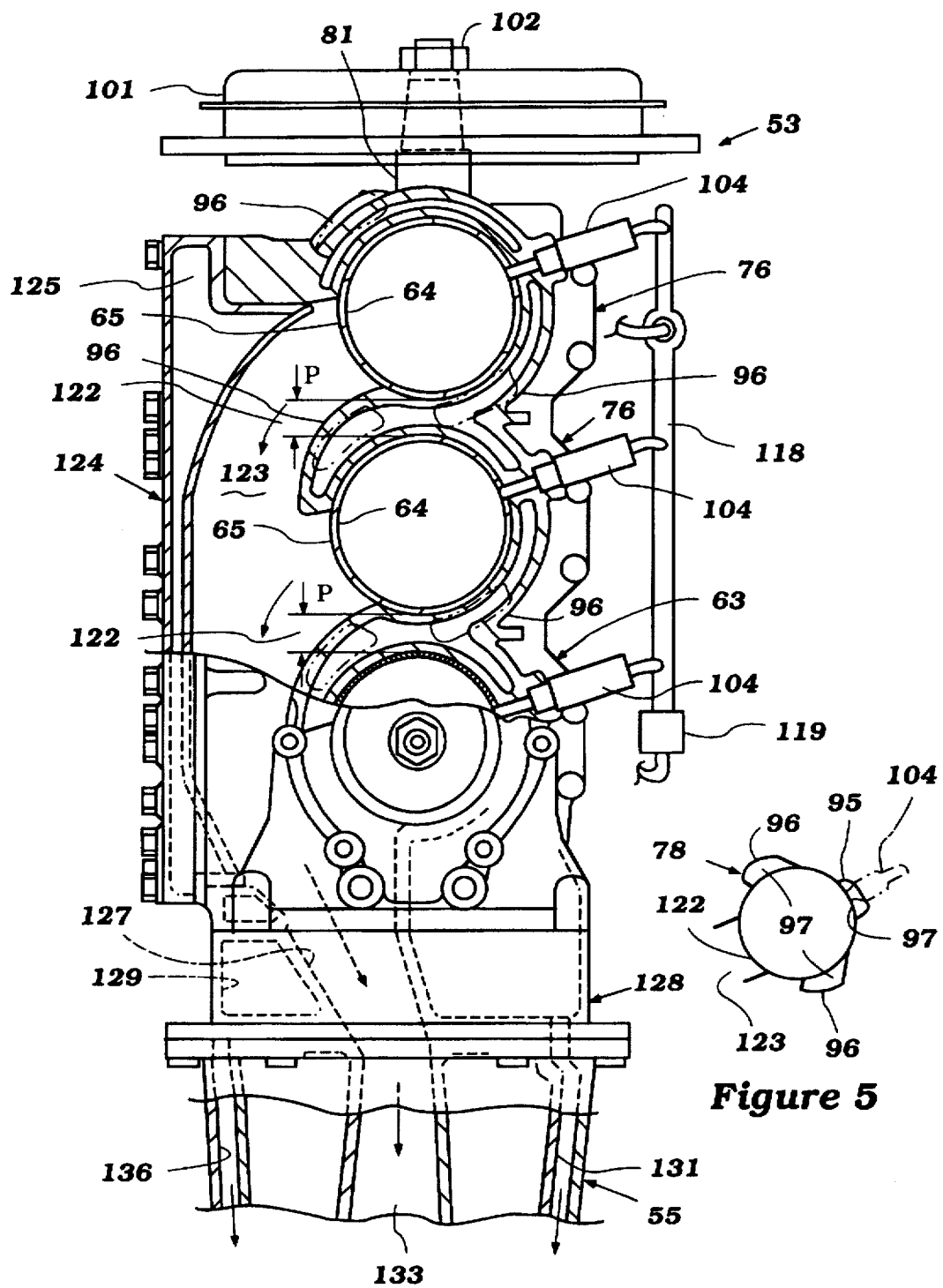
FIG. 4 is a partial cross-sectional view, in part similar to the lower right-hand view of FIG. 1 but with portions of the engine broken away so as to more clearly show the orientation of certain components.
FIG. 5 is a partially schematic view looking in the same direction as FIG. 4 and shows how the cylinder porting and injection arrangement is arranged so as to permit a more compact engine construction.

It should be noted, however, that the injectors 104 are positioned generally vertically above the center scavenge passages 95 for each cylinder. Also, the scavenge passages are rotationally offset, as best seen in FIGS. 7 and 4, so as to permit a relatively close spacing of the distance between these cylinders, indicated by the pitch dimension P in FIG. 4. This rotational offsetting permits close positioning of the cylinder bores 64 without interference between the scavenge passages 96, of adjacent cylinders and thus permits the use of a shorter engine than with other types of constructions.

Figure 2:
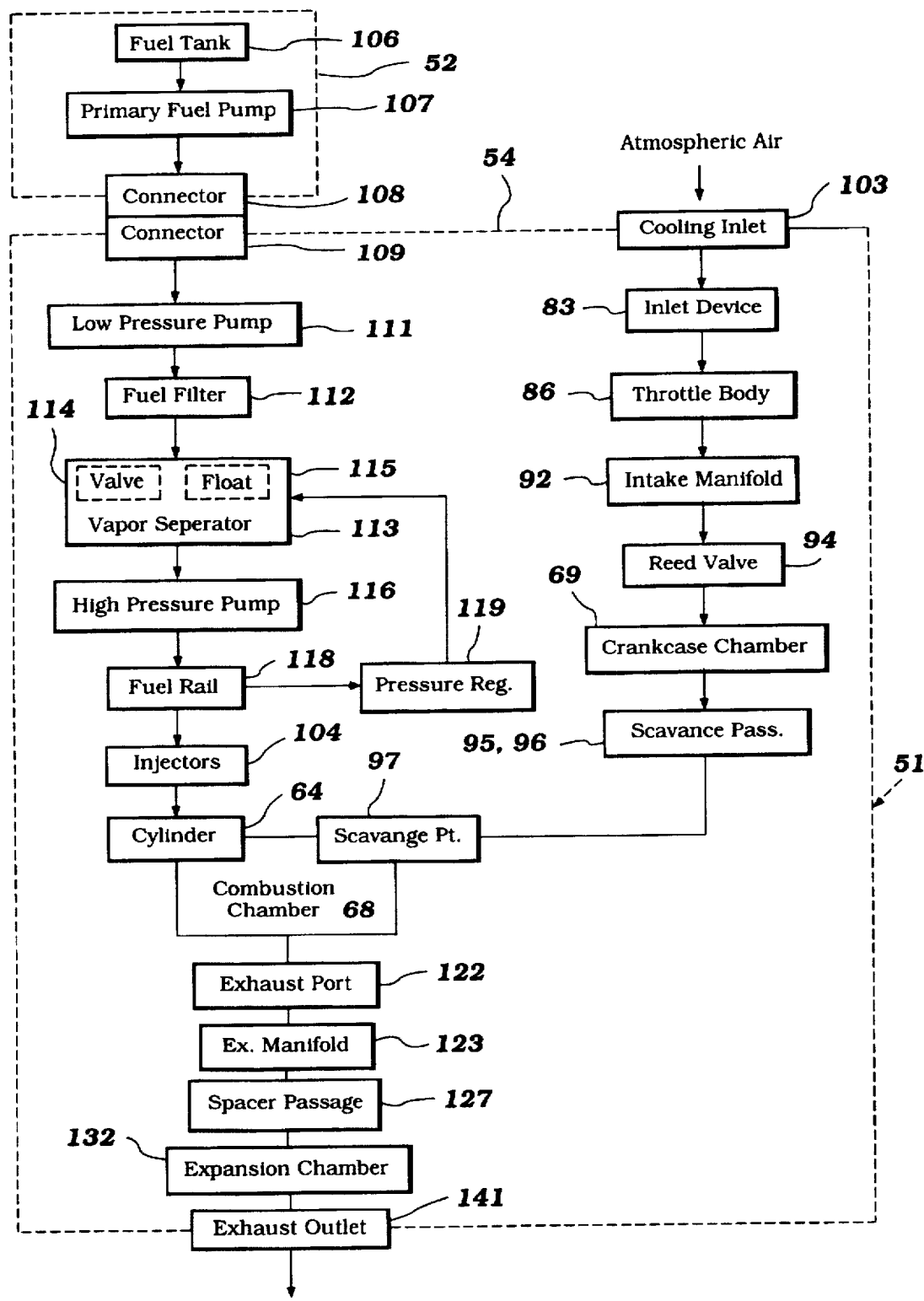
FIG. 2 is a partially schematic block diagram showing the fuel and air supply system for the engine.

Referring now primarily to FIGS. 1 and 2, the fuel supply system includes a portion which is mounted in the hull 52 and which is shown, in part only schematically. This includes a main fuel tank 106 that is mounted within the hull of the watercraft, and which includes a priming pump 107. The pump 107 delivers fuel to the one connector 108 of a quick-disconnect coupling. The coupler 108 communicates with a coupling 109 carried by the cowling tray 54 and which, in turn, delivers the fuel to an engine driven low-pressure fuel pump 111.

The low-pressure fuel pump 111, in turn, delivers fuel under pressure to a fuel filter 112. The fuel filter 112, in turn, delivers fuel to a vapor separator, indicated generally by the reference numeral 113. The fuel vapor separator 113 is comprised of a cavity in which a chamber is formed that is filled with fuel to a predetermined level controlled by means of a float that operates a needle valve 114 for maintaining a uniform level of fuel in the separator 113. The float is indicated schematically at 115.

The vapor separator 113 is provided with an atmospheric vent which may communicate with the air induction system to permit vapors separated from the fuel to be discharged from the vapor separator 113 without being discharged back to the atmosphere.

A high-pressure pump 116 is provided for drawing fuel from within the vapor separator 113 and delivering it to a main fuel line 117. In an actual physical embodiment, the high-pressure pump 116 may, in fact, be immersed within the vapor separator 113.

The high-pressure line 117, in turn, delivers fuel to the fuel injectors 104 through a fuel rail 118. A single fuel rail 118 supplies fuel to each of the injectors 104. A pressure control valve 119 is mounted in one end of the fuel rail 118 and regulates the pressure of fuel supplied to the injectors 104 so as to maintain a substantially constant pressure thereat. This pressure is maintained by dumping excess fuel back to the vapor separator 113 through a return line 121.

Referring again to FIGS. 3 and 4 and in addition to FIGS. 1 and 2, each of the cylinder bores 64 is provided with a respective exhaust port 122 which is generally diametrically opposed to the center scavenge port 97 associated with the center scavenge passageway 95. These exhaust ports 122 extend through the side of the cylinder block 63 and communicate with an exhaust manifold collector chamber 123 formed in the side thereof. This chamber 123 is defined between the cylinder block 63 and a cover piece 124 that is affixed thereto. The cover piece 124 is provided with a cooling jacket portion 125 which is supplied with coolant, in a manner to be described.

In this regard, it should be noted that both the cylinder block 63 and cylinder head 67 are formed with cooling jackets 126. These cooling jackets 126 communicate with each other, and also with the exhaust manifold cooling jacket 125. Cooling water is delivered to these cooling jackets 125 and 126 from the body of water in which the watercraft is operating through a coolant circulation system of a type well known in the outboard motor art. This cooling circulation system includes a water pump (not shown) that is mounted at the interface between the drive shaft housing member 56 and the lower unit 57. Water flows through these cooling jackets 125 and 126 and then is discharged back into the body of water in which the watercraft is operating, in a manner which will be described.

The exhaust manifold or collector section 123 extends downwardly and opens through a lower face of the cylinder block 63. There it communicates with an exhaust passageway 127 formed in a spacer or guide plate, indicated generally by the reference numeral 128, that is disposed between the engine 53 and the upper portion of the drive shaft housing 55. This spacer plate 128 may span the upper portion of the drive shaft housing and be contained within, at least in part, the lower tray 54 of the protective cowling. A water cooling jacket 129 is formed in the spacer plate 128 and encircles the exhaust passage 127 for assisting in cooling and silencing.

Figure 6:
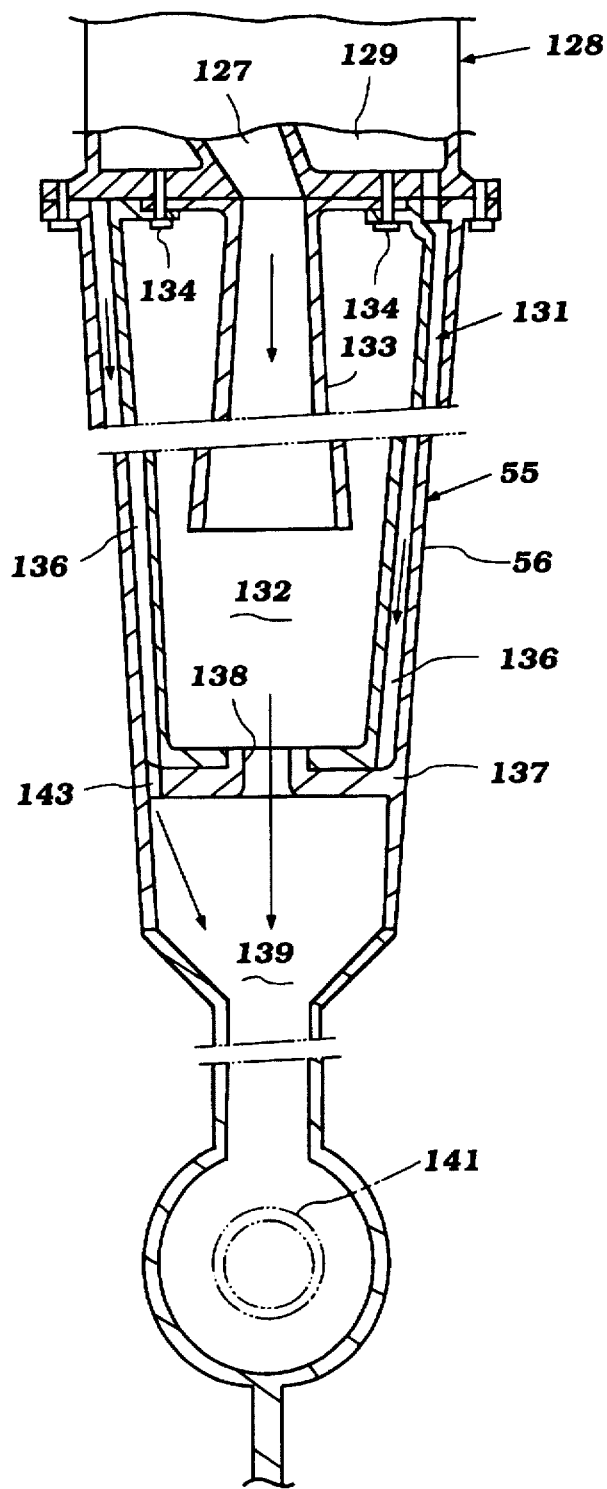
FIG. 6 is a partial cross-sectional view looking in the same direction as FIG. 4 and shows the lower portion of the outboard motor and hence constitutes a further extension of FIG. 4 and of the portion shown in the lower right-hand side of FIG. 1.

Continuing to describe the exhaust system now by added reference to FIG. 6, it will be seen that an inner shell 131 is contained within the upper portion of the drive shaft housing outer casing 56. This inner shell 131 forms an expansion chamber 132. An exhaust pipe 133 is connected to the underside of the spacer plate 128 by fasteners 134, and communicates at its upper end with the spacer plate exhaust passage 127 and at its lower end with the expansion chamber 132. Therefore, exhaust gases flow through this system into the expansion chamber 132 to provide silencing and cooling.

The spacer plate 128 is provided with one or more water drains 135 that communicate the cooling jacket 129 of the spacer plate 128 with a further cooling jacket 136 formed in the area between the inner shell 131 and the drive shaft housing 56. Water fills this chamber and cools the exhaust gases and precludes the transmission of heat to the drive shaft housing 55.

A wall member 137 extends across the lower part of the shell 131 and has an exhaust passage 138 from which exhaust gases may exit the expansion chamber 132 into a high-speed exhaust gas discharge chamber 139 formed in the lower unit 57. This chamber 138 communicates with a through-the-hub exhaust discharge passage 141 so as to discharge the exhaust gases from the engine through a through-the-hub exhaust gas discharge 142 formed in the hub of the propeller 58. Thus, the exhaust gases from the engine will be silenced by this underwater discharge.

The cooling jacket 136 formed around the expansion chamber 132 is formed with one or more drain passages 143 (FIG. 6) that permits engine coolant to mix with the exhaust gases in the chamber 139 and flow out with the exhaust gases back to the body of water in which the watercraft is operating.

In addition to the exhaust gas discharge already described, which may be considered to be a high-speed exhaust gas discharge, the outboard motor 51 may be provided with an above-the-water low-speed exhaust gas discharge. Such discharges are well known in this art and, for that reason, further description of them are not believed to be necessary to permit those skilled in the art to practice the invention.

It will be seen that the exhaust ports 122 are disposed so that their upper opening edge is disposed at a distance ES below the upper cylinder block surface 66 and the upper end of the cylinder bore 64. Also, it will be noted that the exhaust ports 122 open before the scavenge ports 97 open.

Referring now to FIG. 7, certain additional auxiliary components for the engine 53 are illustrated and will be described. As has been noted, the engine is provided with a flywheel magneto assembly 101. This assembly also includes a starter gear that is engaged by an electrically operated starter 144 for electric starting of the engine. The engine 53 may also be provided with a lubricating system of any know type, and this may include a lubricant reservoir 145 mounted in proximity to the air inlet device 83.

Also, the throttle linkage, including the throttle link 89, may be connected to a pulser coil of an ignition system, indicated by the reference numeral 146, so as to provide spark advance, as is well known in this art.

The construction of the engine and outboard motor as thus far described may be considered to be conventional, except for the fuel injector 104 and its mounting and geometric relation to the pistons 72. This construction will now be described by particular reference to FIGS. 3 and 8–16.

Figure 3:
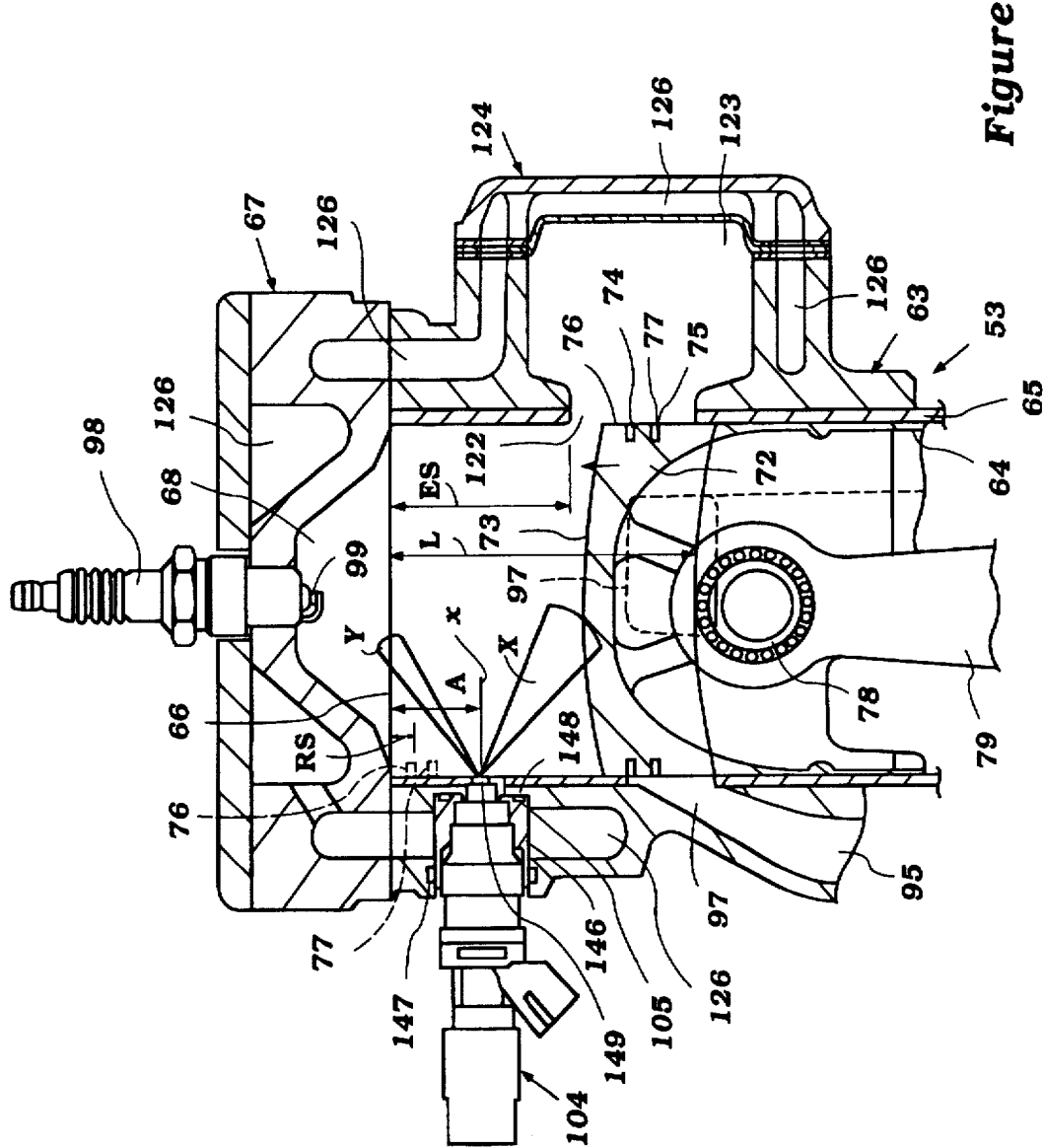
FIG. 3 is a partial cross-sectional view, generally similar to the cross-sectional view of FIG. 1 but showing the components in nonschematic fashion.

Referring first to FIG. 3, this shows the manner in which the injector 104 is actually mounted in the cylinder block 63. The cylinder block 63 is provided with a counter-bored portion adjacent each of its injector clearance holes 105. An injector mounting insert piece 146 is received in this recess and is sealed thereto by a circumferential O-ring 147 and an end O-ring 148. The injector 104 is mounted so that its discharge nozzle portion 149 registers with the cylinder bore opening 105 so that fuel will be sprayed therefrom in a pattern which will be described later in more detail.

Figure 8:
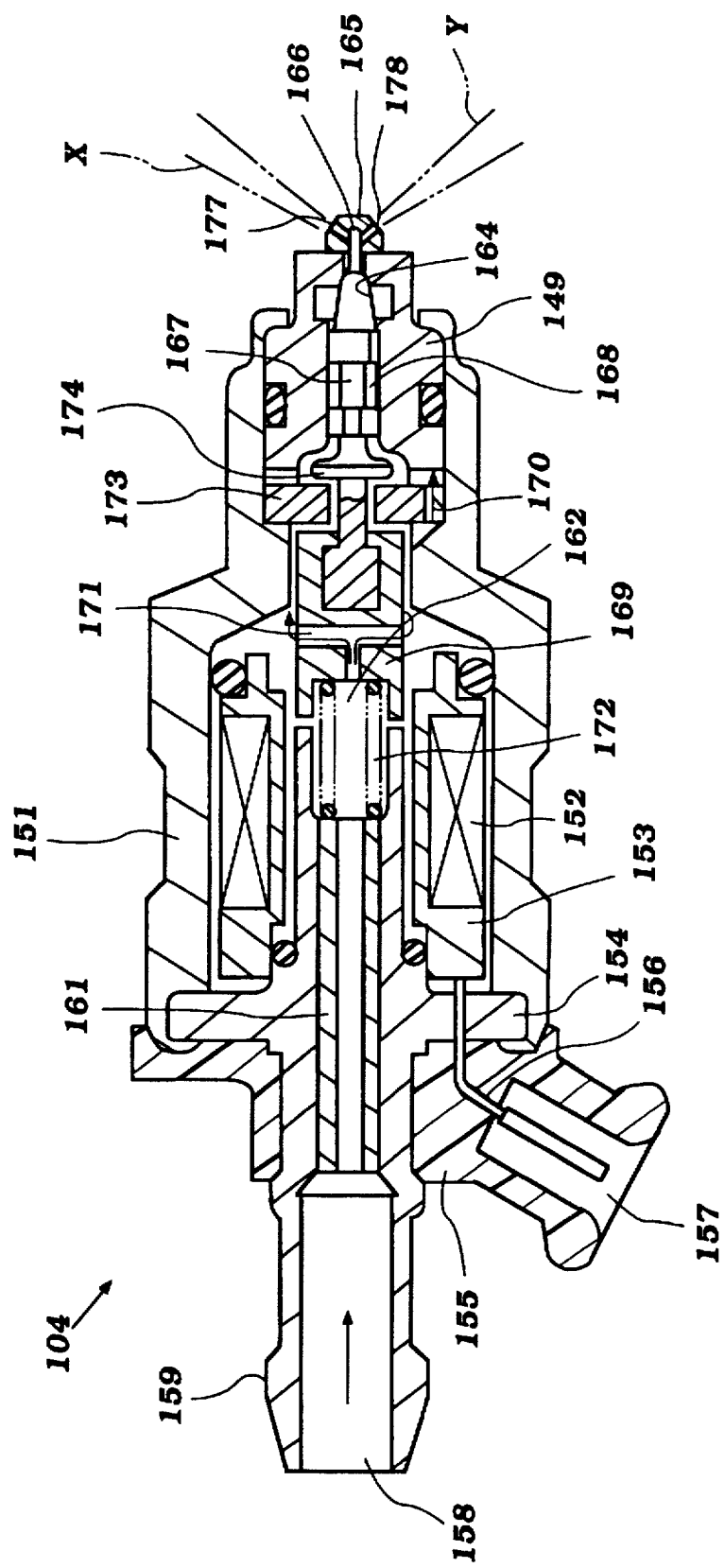
FIG. 8 is an enlarged cross-sectional view showing the fuel injector.
Figure 9:
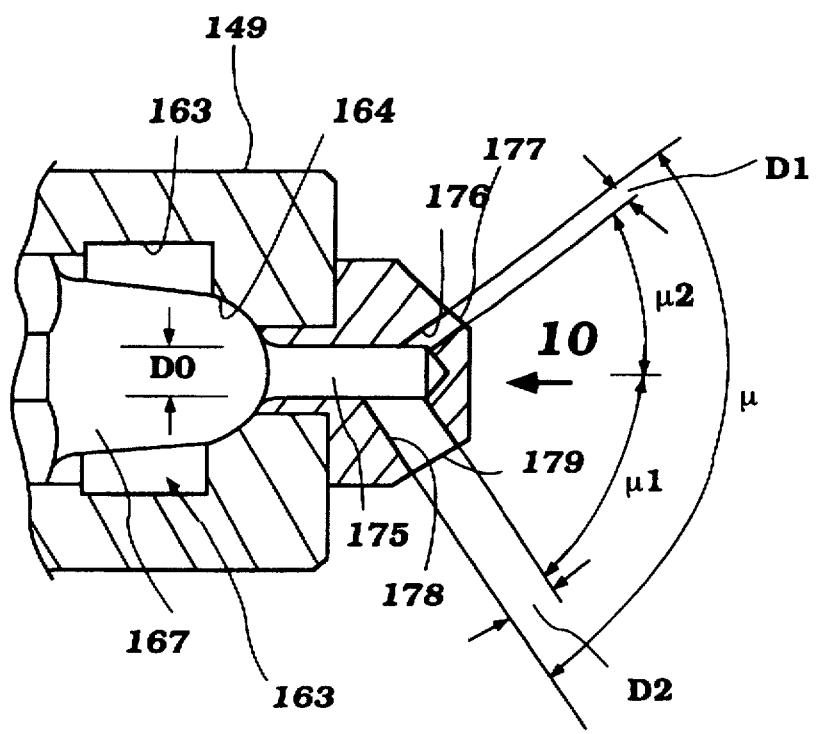
FIG. 9 is a still further enlarged cross-sectional view of the tip of the fuel injector nozzle portion so as to illustrate the spray nozzle openings therein.
Figure 10:
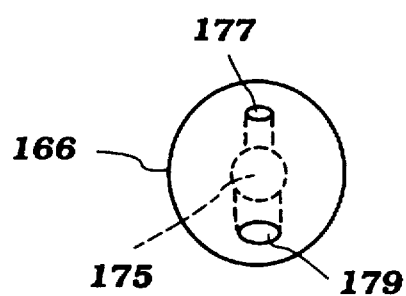
FIG. 10 is a view of the fuel injector nozzle portion on a smaller scale and looking in the direction of the arrow 10 in FIG. 9.

Referring now primarily to FIGS. 8–10, each injector 104 is comprised of a main body portion 151 that defines an internal cavity in which a solenoid winding 152 is supported on a core 153. The core 153 is itself supported on an end closure 154 which is, in turn, sealed by a plastic cap 155. Conductors 156 extend from the winding 152 to a terminal portion 157 formed in the cap 155 for attachment to a controlled electrical source of power. This electrical source of power is controlled in a manner and in accordance with a strategy which will be described.

The end closure 154 is formed with an integral fuel delivery receiving portion 158 that is provided with a bayonetted end 159 so as to accommodate and provide a connection to the fuel rail 118 for supply of fuel to an internal passageway formed by a tubular member 161 that passes through the end closure 154 and which opens into a fuel receiving cavity 162 formed adjacent the nozzle end 149 of the injector. The nozzle portion 149 is formed with a fuel chamber 163 of annular configuration and which is centrally related to a valve seat 164.

The valve seat 164 communicates with a nozzle insert piece 165 that has a flow passage 166 extending therethrough, and which is valved by a pintle-type injector valve 167. The valve 167 is slidably supported by means of a polygonal-shaped portion 168 in a bore of the nozzle piece 149. As its rear end, an actuator element 169 is connected to the pintle valve 167, and it, in turn, has a flow passage 171 formed therein. Thus, fuel can flow from the passage formed by the tube 161 into a spring chamber 172, and then around the valve actuator 171 to the fuel chamber 163 for control by the pintle 164.

A stopper plate 173 having a flow opening 170 is contained at the base of the nozzle piece 149 and is engaged by a ribbed stop surface 174 of the pintle so as to limit the degree of opening of the pintle valve 167. The coil compression spring 172 normally urges the pintle valve 167 to its closed position. When the solenoid winding 153 is energized, the valve actuator 169, which acts as an armature, will be drawn inwardly to move the pintle valve 167 away from the valve seat 164 and permit flow from the discharge. This flow discharge will now be described by primary reference to FIGS. 9 and 10, although it obviously also appears in FIG. 8.

It will be seen that the nozzle insert 166 is formed with a through opening 175 that has a diameter DO and which defines a general axis x which may be considered to be the central axis of the fuel injector nozzle portion 149, which is located, as previously noted, at a distance A (FIG. 3) from the cylinder bore end 66. This flow passage 145 is intersected by a first upwardly directed passage 176 that has an opening 177 in an outer face of the nozzle insert 166. The opening 177 has a diameter D1. The diameter D1 is smaller than the diameter DO. The lower edge of this opening 177 is disposed at an angle μ2 to the axis of the injector.

In addition, the nozzle insert 166 is formed with a second passage 178 which is generally downwardly directed and has an opening 179 in the lower face thereof. The opening 179 has a diameter D2 which is greater than the diameter D1, but also less than the diameter DO. The upper edge of this opening 179 is disposed at an angle μ1 from the injector axis. This angle μ1 is greater than the angle μ2, for a reason which will be described. The total angle of spray provided by the openings 177 and 178 is subtended by the arc μ, which is preferably not less than 45°. In the specific embodiment, the angle μ is about 100°, while the angle μ2 is about 45°, while the angle μ1 is about 55°.

As has been mentioned, the fuel pressure supplied to the injectors 104 is regulated by the regulator 119. Preferably, the fuel supplied to the injector is adjusted to be in the range of 600–600 kilopascal. When this is encountered, then the pressure in the recess 163 will also be at this same pressure when the pintle valve 167 is closed. However, if the injector is opened, the pressure will drop, and the pressure in the chamber 163 will then be about half of the former pressure. The pressure losses are such so that the flow of fuel through the injector openings 177 and 178 is at a velocity of in the range of 10–30 meters per second, and preferably about 20 meters per second. This will control the maximum penetration of the fuel into the cylinder, and will be as described shortly.

Figure 11:
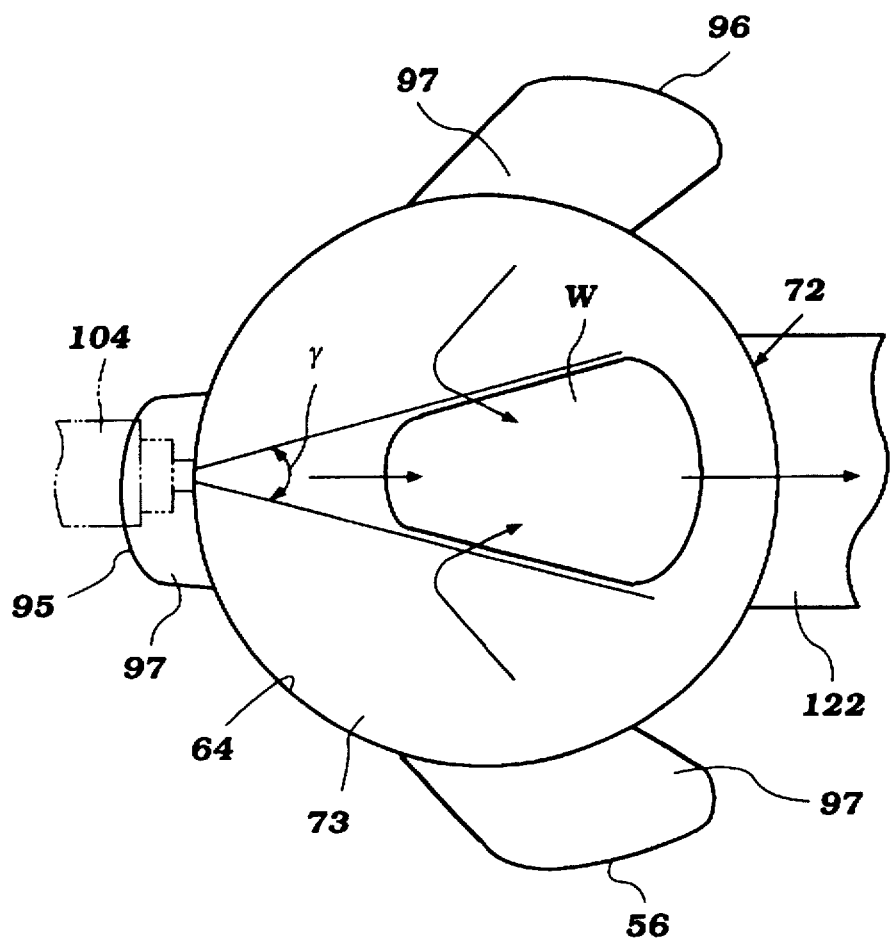
FIG. 11 is a top plan view showing how the spray pattern causes the fuel to impinge upon the head of the piston.

As may be seen in FIGS. 3 and 11, the spray relationship is such that a portion of the fuel, that is, specifically that flowing from the nozzle opening 178, will be directed toward and impinge upon the piston head 73. The remaining fuel spray, which is preferably smaller in volume, will be directed toward the cylinder head recess 68, and specifically, the spark plug gap 99. As a result of this spray pattern, there will be ensured the presence of the stoichiometric mixture at the vicinity of the spark gap 99 when the spark plug 98 is fired. In addition, a homogeneous mixture will fill the remainder of the combustion chamber, which may or may not be stoichiometric, depending upon the engine running condition.

As may be seen in FIG. 11, the spray pattern is such that the wetted area of the piston head 73 will be as indicated at W in this figure. The spray angle in this plane is indicated as λ.

The importance in the relationship of the angles of injection from the injector nozzles 177 and 179 will now be described by particular reference to FIGS. 13–16, which show the condition during various portions of the piston stroke. As has been previously noted, the injector axis, indicated at x in these figures, is such so that the angle μ2 between this axis x and the upper end Y of the spray pattern from the upper directed nozzle opening 177 will be directed toward the gap of the spark plug 98. The actual spray axis from the opening 177 is conical, and is indicated at Y1 in this group of figures. The lower edge of the spray pattern is at the angle β2 from the axis x. As has been previously noted, the amount of fuel in the spray pattern Y is less than that from the spray pattern X associated with the nozzle port 179.

Referring to that particular nozzle pattern, it has been previously noted that the upper edge of this spray pattern is at the angle μ1 below the spray axis x. It should be noted that this angle is such that it is less than the angle between the spray axis x and the upper edge of the exhaust port 122, which angle is indicated at EX1. Hence, the spray pattern X is such from the nozzle port 179, which spray pattern is also conical and indicated at X1, so that it will be directed below the upper edge of the exhaust port under all conditions. The lower peripheral extent of this spray pattern from the lower nozzle port 179 is at a point β1 so that the spray will contact the head of the piston during a substantial portion of the spraying interval.

Figure 13:
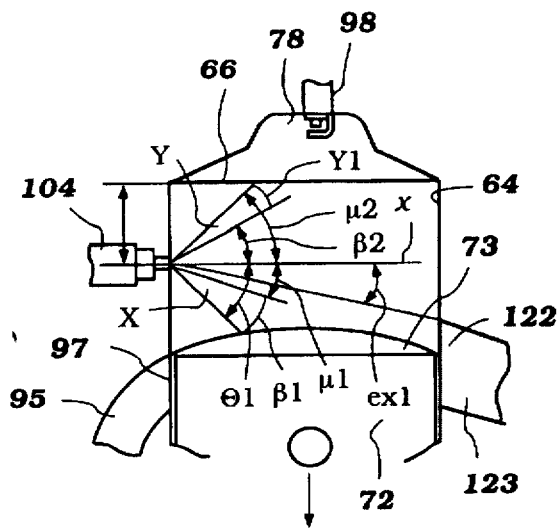
FIGS. 13, 14, 15, and 16 are cross-sectional views, in part similar to FIG. 3 and show the relationship of the spray pattern and fuel spray to the piston during the various portions of the stroke and may also be understood by reference to FIG. 12.

Thus, the spray interval is chosen so that the fuel from the nozzle 104 will be directed to the combustion chamber recess 78, and the area around the spark plug gap 99, and on the head 73 of the piston 72, but will be blocked from passing out of the exhaust port 122. Therefore, the timing of fuel injection is begun when the piston is on its downstroke, as shown in FIG. 13, but so that the penetration of the fuel spray will not reach the exhaust port opening 122. The condition shown in FIG. 13 is the condition at the start of injection when the engine is running at high-speed, high-load. This is the earliest time of injection and the most difficult condition.

Figure 14:
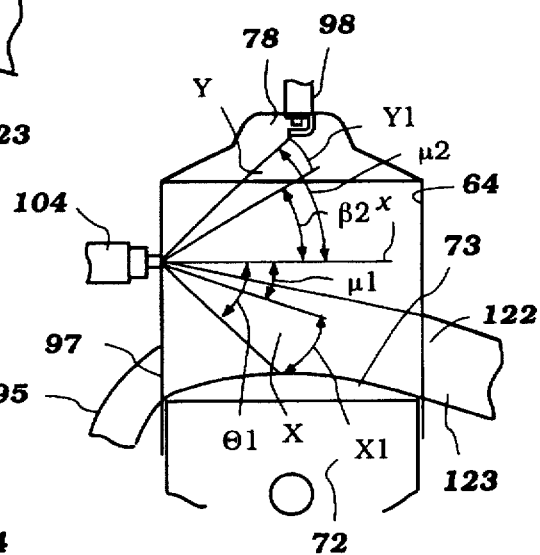
Figure 15:
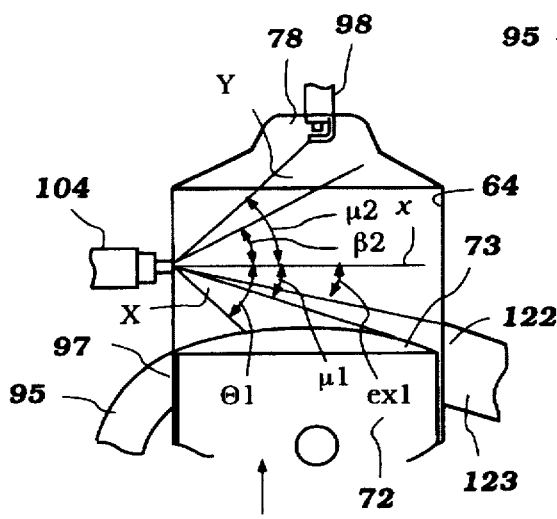
Figure 16:
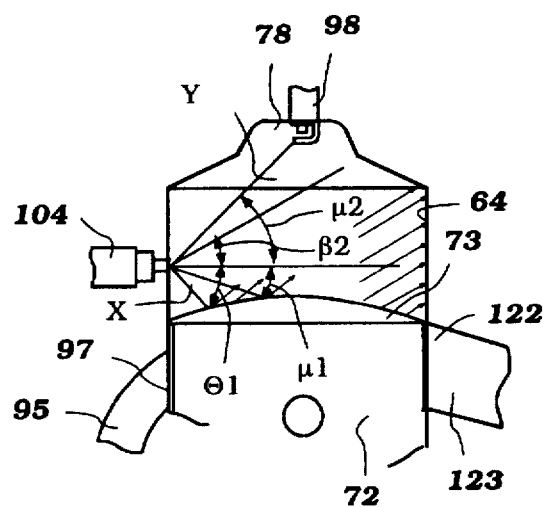

As the piston continues to move downwardly to the position shown in FIG. 14, and is, at this time, at its bottom dead center position, the fuel which impinges on the piston head 73, will be directed upwardly away from the exhaust port, as shown in the shaded lines in FIG. 16. Hence, the fuel impingement on the piston head 73 will occur first on the side well away from the exhaust port, and will only impinge upon the head of the piston at the side toward the exhaust port at the end of the stroke and after the piston has begun to move toward its top dead center position, as shown in FIG. 15.

The head 73 of the piston is highly heated, and the fuel spray impinging on it will have two important benefits. First, the fuel that evaporates and bounces off will be directed away from the exhaust port and toward the spark gap 99. In addition, the impingement of the fuel on the piston head 73 will also cause a cooling effect on the piston so as to reduce the likelihood of piston burning, even under high-load, high-speed conditions.

The timing of the fuel injection and the relationship of the piston to the location of the injector axis x is quite important in ensuring maximum performance of the engine and adequate fuel supply under all running conditions. The various running conditions will be described shortly by reference to FIG. 12, but before describing that figure, these critical relationships will be detailed. The details are such that the location of the injector axis x at the distance A from the cylinder bore surface 66 relative to the stroke of the piston and the distance RS from the lowermost edge of the piston ring falls into the following relation relative to bottom dead center position L of the piston. This ratio should preferably be in the range so that RS<A<0.3L. This ratio has been found to provide adequate time for fuel injection under all conditions, and insurance against the fuel spraying out of the exhaust port 122.

To further ensure this, the distance between the upper peripheral edge of the exhaust port and the cylinder head cylinder block surface 66 (ES) should be such that 0.35 ES<A<0.65 ES. These relationships will ensure this result.

Although the specific control strategy by which the engine 53 is operated may be of any known type, the general components utilized in the engine management system will be described, referring back to FIG. 1. These components include a number of sensors of sensing both engine running conditions, as well as ambient conditions. Of course, it should be apparent to those skilled in the art, that the sensors which will be described are only typical of those types of sensors which can be utilized with the engine management system. Basically, the important feature of the invention is the timing strategy for fuel injection and the orientation and location of the fuel injector 104 and its spray paths X and Y.

Referring now specifically to FIG. 1, the system includes a main ECU 181 which controls through appropriate output signals the timing and duration of fuel injection from the fuel injector 104, which timing will be described later by reference to FIG. 12, the timing of firing of the spark plugs 98, and also the operation of the high-pressure fuel pump 116, so as to control its output.

The engine condition sensors include a throttle position sensor 182 that is associated with the throttle valve 87 and outputs a signal to the ECU 181 that indicates the operator demand, or alternatively, the load on the engine.

Positioned in the intake manifold 93 is an intake air temperature sensor 183 which also outputs its signal to the ECU 181.

As is well known in two-cycle engine practice, air flow to the engine may be accurately determined by measuring crankcase pressure at certain crank angles. Therefore, there is provided a crankcase pressure sensor 184 in the crankcase chamber 69, and which outputs a signal to the ECU 181 indicative of crankcase pressure.

The crank angles for setting both timing of the various firing intervals of the spark plugs 98 and the injectors 104 and for indicating engine speed, is supplied by a crank angle sensor 185 which cooperates with a toothed gear on the crankshaft 81 so as to output appropriate signals indicative of crank angle to the ECU 181. By summing these crank angle pulses in a given time period, it is also possible to measure engine speed.

There is also provided an in-cylinder pressure sensor 186 that will output signals to the ECU 181 indicative of the actual pressure in the combustion chamber 68. This signal may be utilized for appropriate engine controls in accordance with any strategy known in the art.

There is further provided a knock detector 187, also mounted in the cylinder head 67, and which outputs its signal to the ECU 181. Appropriate knock control strategies may be employed for engine control.

The control system for the engine may also include a feedback control system that employs an oxygen sensor, indicated by the reference numeral 188. The oxygen sensor 188 is disposed in a chamber 189 that communicates with the cylinder bore 64 or combustion chamber recess 68, and which receives exhaust gases. These exhaust gases are then discharged into the exhaust manifold 123 through a check valved passageway 191. The output from the oxygen sensor 188 can be utilized to determine whether the air-fuel ratio is as desired, in a known manner.

Engine temperature is measured by a cylinder block engine temperature sensor 192 that is mounted in proximity to the cooling jackets afore referred to, and which will output a signal indicative of engine operating temperature for appropriate control.

It may also be desirable to measure the temperature of the cooling water which is delivered to the engine, and for this purpose, there can be provided a water inlet temperature sensor 193.

Under some conditions, it may also be desirable to be able to read the condition of the transmission which is in the lower unit 57 for driving the propeller 58, and a transmission condition sensor 194 is provided for this purpose.

In addition to those engine and engine-related sensors, there may also be provided an exhaust back pressure sensor 195. A trim angle sensor 196 senses the angle of trim of the outboard motor, and also outputs its signal to the ECU 181. Ambient conditions, such as atmospheric air pressure, may be sensed by a sensor 197, and also outputs its signal to the ECU 181. These various sensors and their signals can be utilized in accordance with any desired control strategy.

Figure 12:
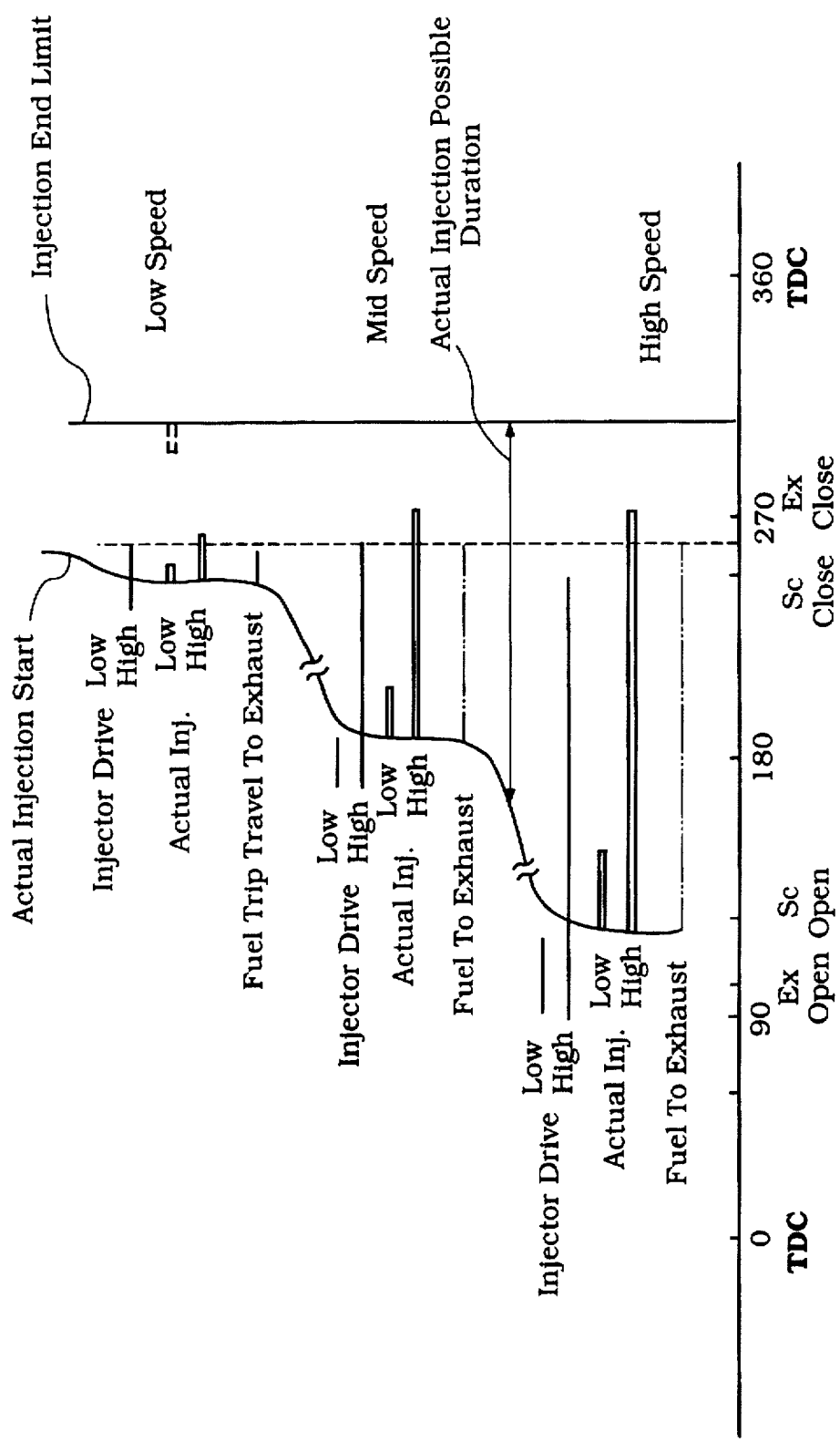
FIG. 12 is a timing diagram showing the events and sequence of operation in accordance with this embodiment of the invention.

FIG. 12 shows the timing cycle during a complete revolution from top dead center to top dead center, the injector location, the timing of exhaust port opening and scavenge port opening, the timing of scavenge port closing and exhaust port closing, and the point in time when the piston will pass the fuel injector, which determines the ultimate injection end timing.

As may be seen, in given engine conditions, the injector actuating signal precedes the actual injection timing because of the lag. However, by timing the injection so as to incur earlier and earlier as the engine speed and load increases, it can be ensured that the travel of fuel from the tip of the injector to the exhaust port can be ensured that there will be no fuel that passes out of the exhaust port under all running condition. This is possible because of the arrangement of the components as thus far described, and particularly the location of the fuel injector axis x at the distance A from the top of the cylinder bore 64.

As has been noted, in addition to the location of the fuel injector 104 along the cylinder bore axis in relation to the piston travel, the spray pattern is also important. As has been noted, the spray range should encompass an arc at least as great as 45° and preferably 100°, and also more fuel should be sprayed toward the piston rather than toward the cylinder head recess 78 and spark gap 79.

Next will be described a number of fuel injector nozzle configurations and their relationship to those components of the engine. The first of these alternate embodiments appears in FIG. 17, and it includes an injector tip 201 that is configured so as to provide a fuel spray that is more concentrated on the spark plug side adjacent the spark plug gap 199 than the conical spray previously proposed. In addition, a wider range but narrower height spray also is directed toward the piston head 73 so as to concentrate the spray on the side of the piston closest the injector nozzle 201.

Therefore, the injector nozzle 201 is provided with a first spray port 202 that sprays upwardly through the range Y and concentrates the fuel spray in the transverse direction in the area of the spark plug 98 and its spark gap through the use of an oval-shaped configuration, with the long axis of the oval passing parallel to the axis of the cylinder bore 64.

On the other hand, an oval spray port 203 of larger dimension is disposed on the lower side and sprays through the range X so as to concentrate the fuel spray on the side of the cylinder bore where the fuel injector 104 is positioned. Thus, the possibility of fuel flowing out of the exhaust port 122 is still further protected against.

Figure 20:
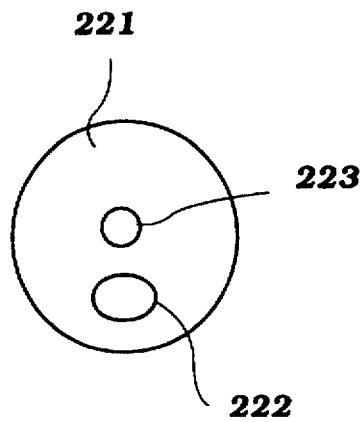
FIG. 20 is an end view in part similar to FIGS. 10 and 18 and shows another spray nozzle arrangement.
Figure 21:
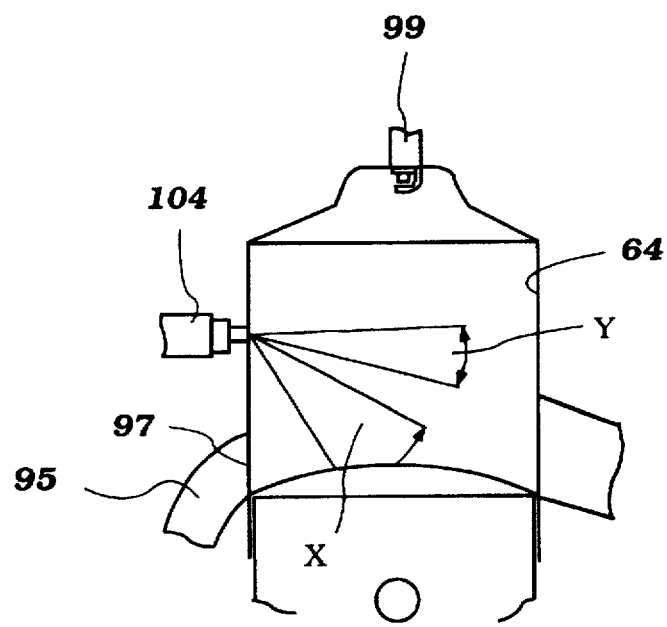
FIG. 21 is a partially schematic, cross-sectional view, in part similar to FIGS. 3 and 19 and shows the relationship of this spray nozzle embodiment to the piston and cylinder head.

FIGS. 20 and 21 show yet another embodiment. This embodiment includes an injector nozzle tip 221 that has a lower oval-shaped port 222 that sprays through the arc X and in a pattern similar to the opening 203 of the previous embodiment. An upper port 223 sprays generally radially across the cylinder in the range Y. This is still above the exhaust port 122, but not toward the spark plug as much as the previously described embodiment. However, a stoichiometric mixture will be ensured in the area of the spark plug at the time of firing because of the piston travel and the resulting upward motion of the fuel spray.

Figure 22:
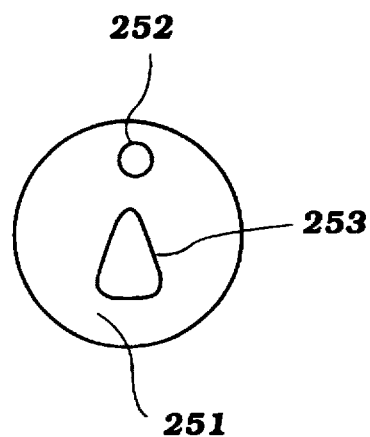
FIG. 22 is an end elevational view, in part similar to FIGS. 10, 18, and 20 and shows yet another embodiment of the invention.

Another nozzle tip is shown in FIG. 22 and is identified by the reference numeral 251. This nozzle tip has a cylindrical upper port 252 which is directed more toward the spark plug, and a triangular-shaped lower port 253. The base of the triangle is wide in the area close to the injector side and hence, fuel will be concentrated on the side of the piston head away from the exhaust port.

Figure 23:
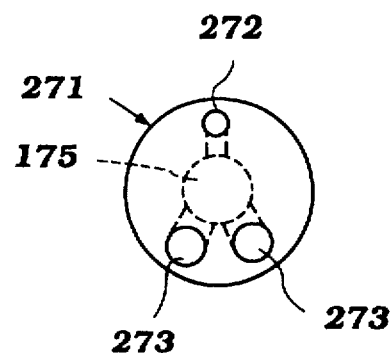
FIG. 23 is an end elevational view in part similar to FIGS. 10, 18, 20, and 22 and shows yet another spray nozzle arrangement.
Figure 24:
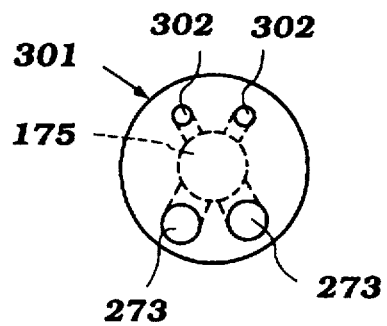
FIG. 24 is an end elevational view in part similar to FIGS. 10, 18, 20, 22 and 23 and shows yet another embodiment of the invention.

FIGS. 23 and 24 show two additional embodiments that utilize more than one spray port. Referring first to FIG. 23, the nozzle, indicated by the reference numeral 271, has, like those previously described, a central supply passage 175. This passage 175 is intersected by an upper small passageway 272 that is directed upwardly toward the cylinder head recess 68 and the spark gap 99.

Two larger lower passages 273 are directed downwardly toward the head of the piston. Because these passages are disposed in side-by-side relationship, they will result in a somewhat oval-shaped spray pattern, like those embodiments of FIGS. 17–19, 20, 21 and 22.

Another nozzle tip is shown in FIG. 24, and identified by the reference numeral 301. This embodiment is basically the same as the embodiment of FIG. 23, but employs, instead of a single upwardly directed nozzle port, it incorporates a pair of small nozzle ports 302 that are upwardly directed.

Figure 25:
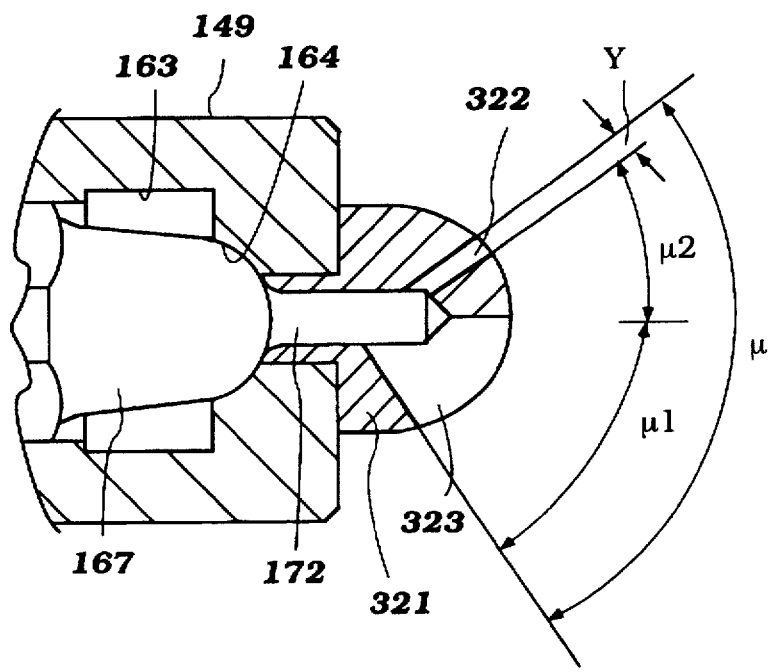
FIG. 25 is a cross-sectional view, in part similar to FIGS. 9 and 174 and shows a still further embodiment of the invention.
Figure 26:
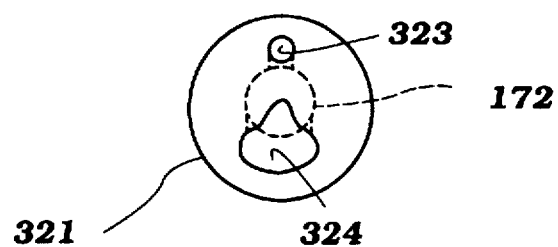
FIG. 26 is an end elevational view of the embodiment of FIG. 25 looking in the direction of the arrow 26 therein.

Yet another nozzle port arrangement is shown in FIGS. 25 and 26, and this includes, in addition to the nozzle piece 321, a showing of some of the components as previously described. These components are identified by the same reference numerals and will not be described again.

In this embodiment, the nozzle tip 321 is provided with a first upwardly directed port 322 that sprays through an arc Y which has a relatively shallow height, and which is disposed at the angle $\mu 2$, which is within the range as described in conjunction with the construction shown in FIG. 9.

A somewhat pear-shaped lower port 323 is provided that has a larger base than top so as to again cause the fuel to be congregated more toward the injector side than the exhaust side of the piston head 73. The angle of this discharge port is such that the total angle $\mu$ is more than 45°, and preferably approximately 100°, as with the embodiment of FIG. 9. However, this configuration will provide more fuel impingement on the injector side of the piston than the exhaust side.

Figure 27:
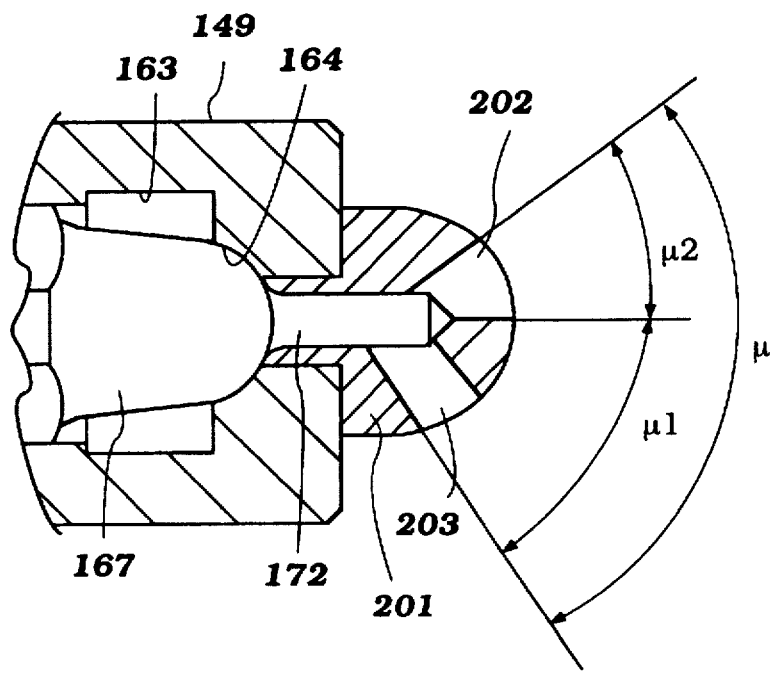
FIG. 27 is a cross-sectional view in part similar to FIGS. 9, 17, and 25 showing a still further embodiment of the invention.
Figure 28:
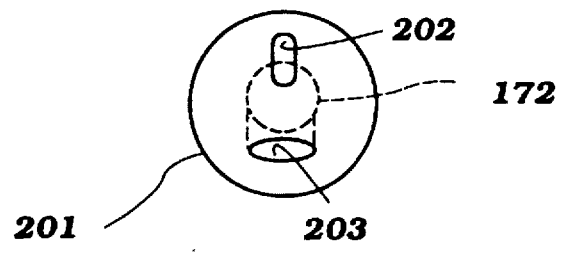
FIG. 28 is an end elevational view looking in the direction of the arrow 28 in FIG. 27.

FIGS. 27 and 28 show another embodiment that is generally similar to the embodiment of FIGS. 17–19. Because of this similarity, the components in this embodiment have been identified by the same reference numerals as previously applied and they will not be described again.

In the embodiments of the invention as thus far described, the fuel injector has been provided with a stopping mechanism that requires some form of bypass around it and the stop such as the passage 170. Reference may be had to FIG. 8, and the elements 174 and 173. As may be seen, there must be provided a bypass passageway 170 around the seating engagement, or the seating surface 174 must be provided with flow grooves.

Figure 29:
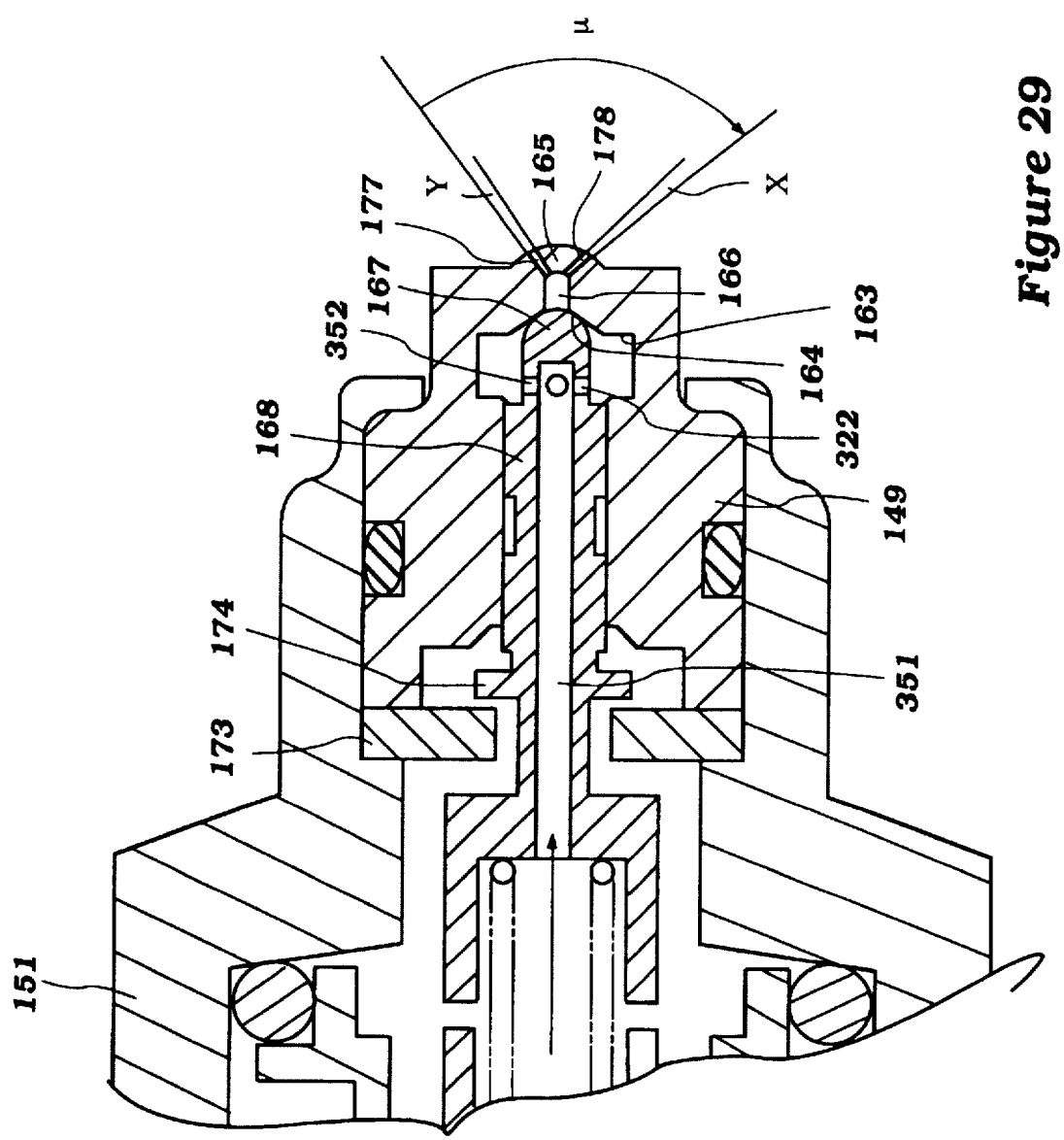
FIG. 29 is a partial cross-sectional view in part similar to FIGS. 9, 17 and 25 and shows a fuel injection nozzle constructed in accordance with yet another embodiment of the invention.

FIG. 29 shows another embodiment wherein a passageway, indicated generally by the reference numeral 351, extends through both the valve actuator element or armature 169, and the pintle portion 167. The end of this passageway 351 is intersected by radially extending passageways 352 that open directly into the fuel chamber 163 of the nozzle piece so as to facilitate fuel delivery to this point. This construction may be utilized with any of the embodiments as thus far described.

In all of the embodiments as thus far described, the nozzle piece is provided with at least two separate discharge openings through which the fuel is sprayed both upwardly toward the combustion chamber recess and downwardly toward the head of the piston. Next will be described some embodiments wherein two separate passageways are not required.

Figure 30:
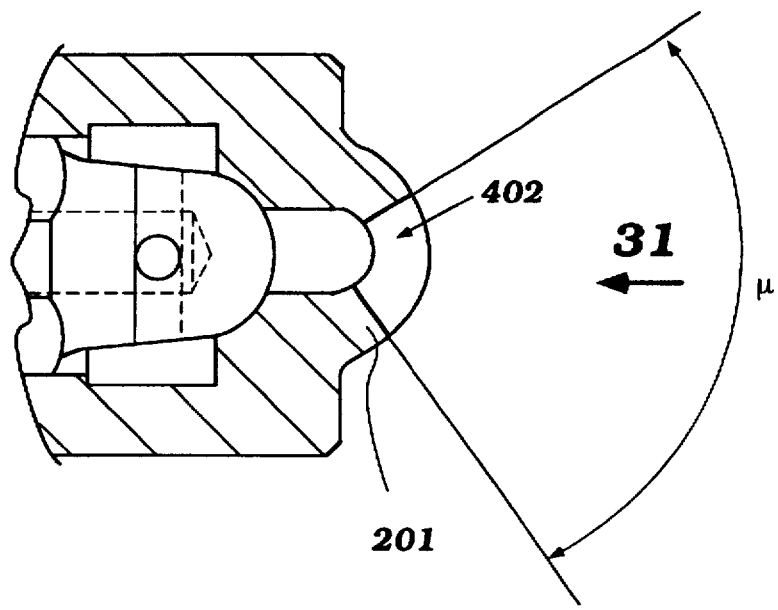
FIG. 30 is a partial cross-sectional view in part similar to FIGS. 9, 17, 25 and 29 and shows still another embodiment of the invention.
Figure 31:
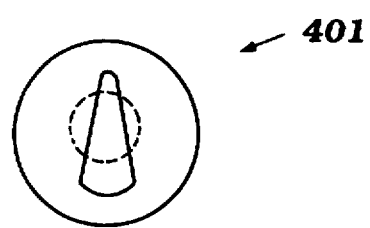
FIG. 31 is an end elevational view of the nozzle of FIG. 30 looking in the direction of the arrow 31.

Turning first to the embodiment of FIGS. 30 and 31, a nozzle piece 401, constructed in accordance with this embodiment, is provided with a triangular-shaped flow opening 402 through which fuel may flow through an arc $\mu$, which arc has a range of at least 45°, and preferably in the range of 100°. In all other regards, this embodiment is the same as those previously described and, therefore, further description of this embodiment is not believed to be necessary to permit those skilled in the art to practice the invention.

Figure 32:
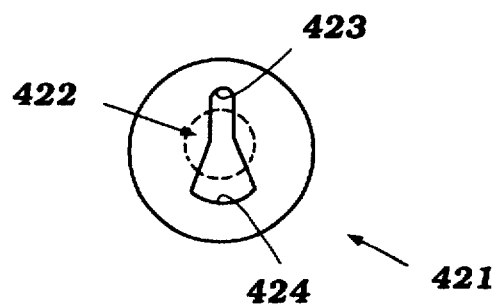
FIG. 32 is an end view in part similar to FIGS. 10, 18, 20, 22, 23, 24, 26, 28, and 31 and shows still a further embodiment of the invention.

Another nozzle piece is shown in FIG. 32, and identified by the reference numeral 421, that has only a single opening 422. This opening has an upper portion 423 that is relatively narrow and long, and a lower pie-shaped portion 424, which will direct fuel spray toward the head of the piston.

Figure 33:
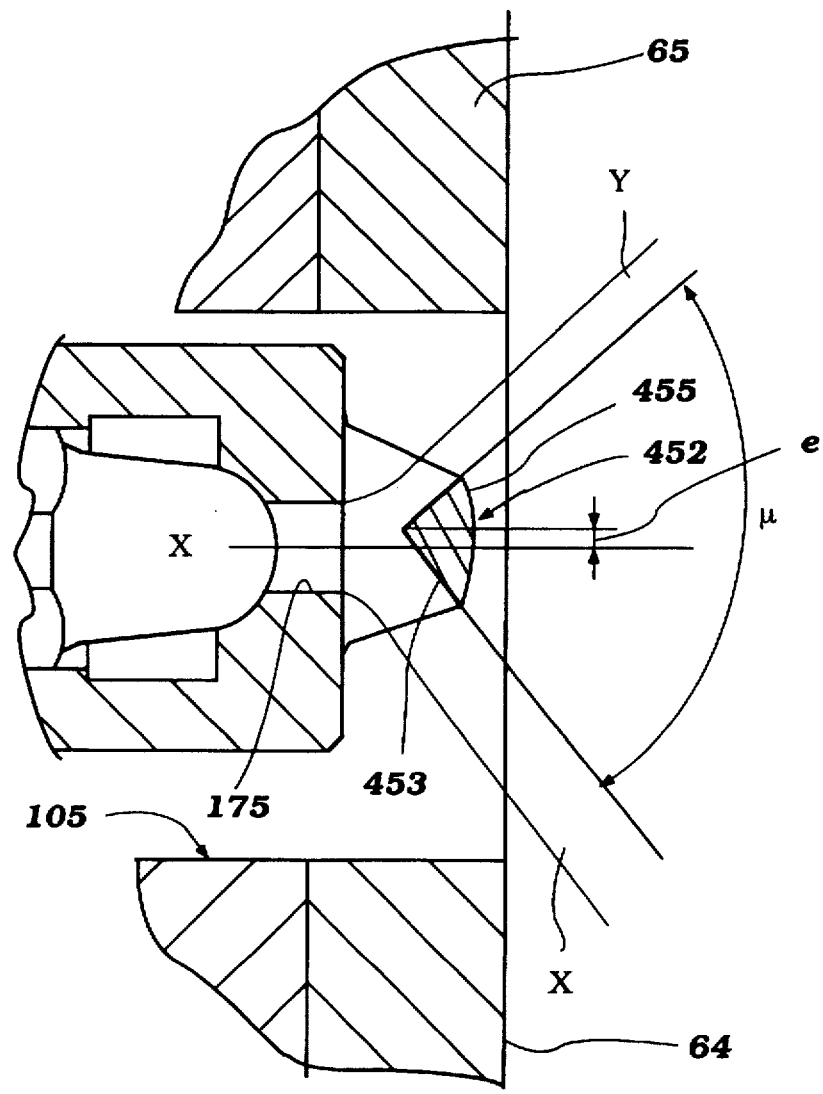
FIG. 33 is a cross-sectional view taken through a cylinder of an engine showing another injection nozzle and depicting how the injection nozzle is recessed into the cylinder liner for its protection.
Figure 34:
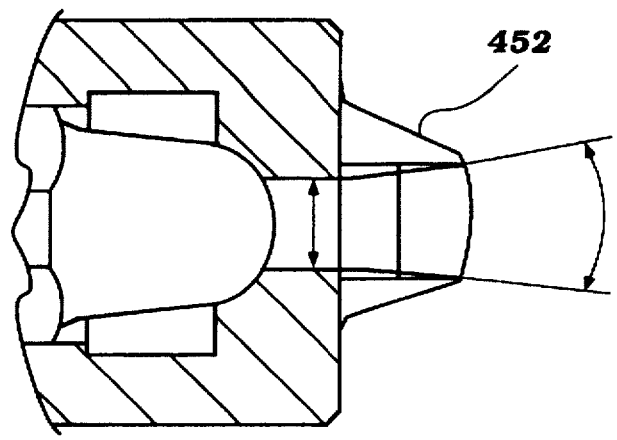
FIG. 34 is a cross-sectional view of the embodiment of FIG. 33 taken along a plane perpendicular to that of FIG. 33.

FIGS. 33 and 34 show another embodiment, and show in more detail how the opening 105 is formed in the cylinder liner, and the relationship of the nozzle piece, indicated by the reference numeral 451 in this embodiment, are interrelated. It will be seen that the nozzle piece 451 has its tip portion 452 extending into the depth of the cylinder liner 65, but terminating short of the cylinder bore 64. In this embodiment, the fuel spray communicated from the passageway 175 communicates with the tip portion 452, which has a generally slotted opening comprised of a lower portion 453 and an upper portion 454, which are separated by a bar-like part, indicated generally by the reference numeral 455. The center of the bar-like part 455 is offset from the spray axis x of the injector, upwardly toward the cylinder head by an offset e. Hence, there is provided an arc μ between the surfaces of the openings 453 and 454 that provide an upper spray path Y and a lower spray path X. These spray paths have the same relationship as that previously described.

Figure 35:
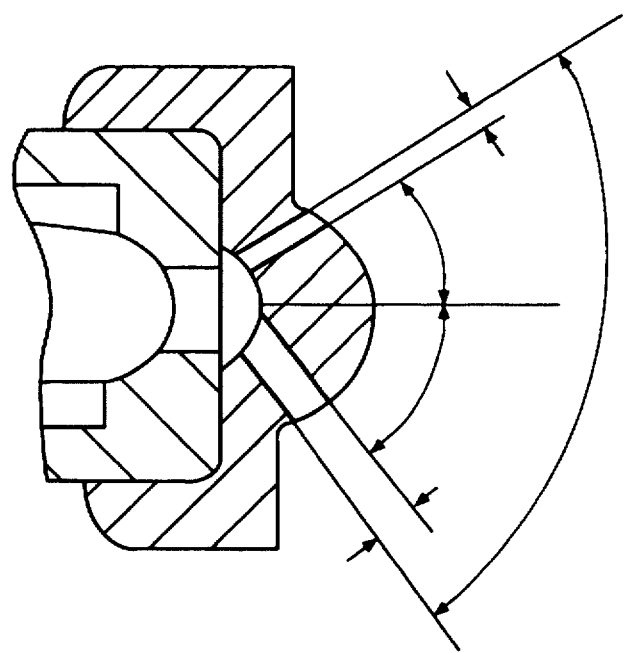
FIG. 35 is a cross-sectional view, in part similar to FIGS. 9, 17, 25 and 29 and shows yet another embodiment of the fuel injection nozzle.

FIG. 35 shows another possible spray pattern having two separate openings, and which uses a rounded-type tip rather than the tapered-type tip as previously described. Hence, the reference characters utilized to identify the components in this embodiment are the same as those utilized in describing the embodiments of FIG. 9.

Although the embodiments of the invention as thus far described have all been related to the application of the invention to an outboard motor, the invention is also susceptible of use, as has been mentioned, in a wide variety of other applications for internal combustion engines. FIGS. 36–39 show another embodiment of the invention wherein an engine constructed and operated in accordance with this embodiment is indicated by the reference numeral 501 and is utilized as the power plant for a motorcycle, indicated generally by the reference numeral 502. This is another potential application for the invention as is the application to various other types of vehicles including land vehicles.

Figure 36:
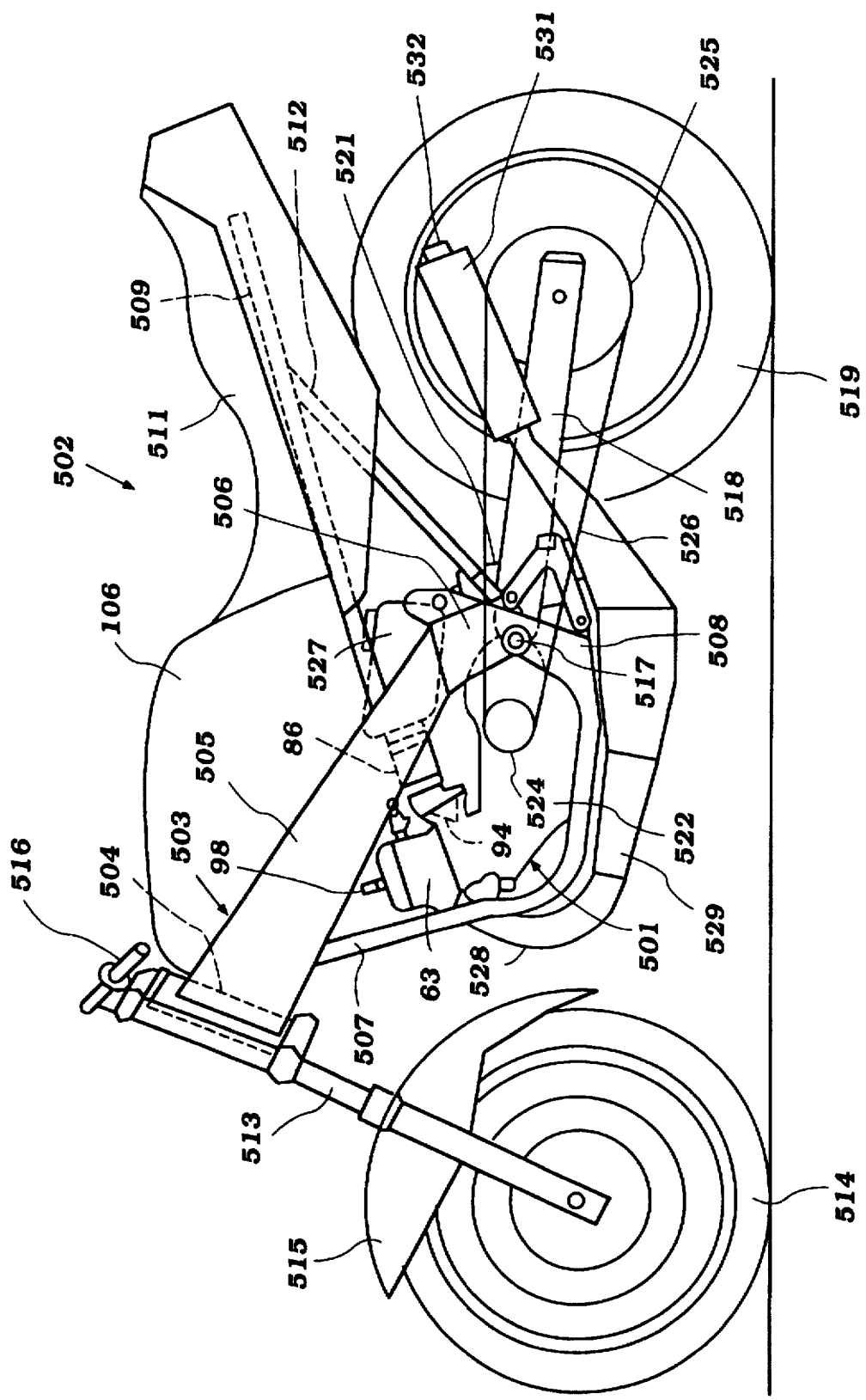
FIG. 36 is a side elevational view of a motorcycle showing another environment in which the invention may be utilized.

In order to set the environment for the invention, the construction of the motorcycle 502 will be described primarily by the reference to FIG. 36 where it is shown in solid lines. The motorcycle 502 is comprised of a built-up frame assembly, indicated generally by the reference numeral 503, and which includes a head pipe 504. Extending rearwardly and downwardly from the head pipe 503 are a pair of main frame members 505 which terminate at a rear bracket 506 to which they are rigidly connected, as by welding.

A pair of downtubes 507 extend downwardly from the forward portion of the main tubes 503 to which they are fixed as be welding. These downtubes 507 extend downwardly and then rearwardly and also connected to a lower portion 508 of the bracket 506 as by welding.

The frame further includes a seat rail 509 that extends rearwardly from the main frame members 505 and which carries a seat 511. The seat 511 is further supported by rear seat stays 512 that extend upwardly and rearwardly from the bracket 506 for connection to the seat rail 509.

A fuel tank which is indicated by the reference numeral 106, that utilized to identify the fuel tank of the previously described embodiment, is disposed forwardly of the seat 511 and is supported by the main frame members 505 in any known manner.

A front fork 513 is dirigibly supported by the head tube 504 and journals a wheel 514 at its lower end. A front fender 515 may also be carried by the front fork 513. The front fork 513 and front wheel 514 are steered by a handle bar assembly 516 disposed forwardly of the seat 511 and the fuel tank 106.

The bracket assembly 506 provides a pivotal support 517 for a trailing arm assembly 518. A rear wheel 519 is rotatably journaled at the rear end of the trailing arm 518. The rear suspension including the trailing arm 518 is controlled by a linkage and shock absorber assembly which is does not appear in significant detail, but which is indicated by the reference numeral 521.

In accordance with conventional motorcycle practice, the engine 501 is provided with a crankcase transmission assembly 522 that includes a transmission case portion 523. This transmission case portion 523 contains, as is typical with motorcycle practice, a change speed transmission that drives an output sprocket 524 at selected speed ratios. The sprocket 524, in turn, drives a sprocket 525 that is fixed for rotation with the rear wheel 519 through a chain 526.

Before turning further to the internal details of the engine 501, its induction and exhaust system will be described in detail. The induction system is basically the same as the induction system employed in conjunction with the outboard motor 51 of the embodiment of FIGS. 1–16. However, rather than using only an air inlet device that employs a silencer, the engine 501 is provided with an atmospheric air inlet device 527 which is disposed to the rear of the engine 501 and beneath the fuel tank 106. This device 527 includes, in addition to a silencing arrangement, a filter for removing foreign particles from the air. Beyond this, the air inlet device 527 supplies the inducted air to a throttle body 86 and intake manifold 92 that serves intake ports 93 in which reed-type check valves 94 are provided.

Figure 37:
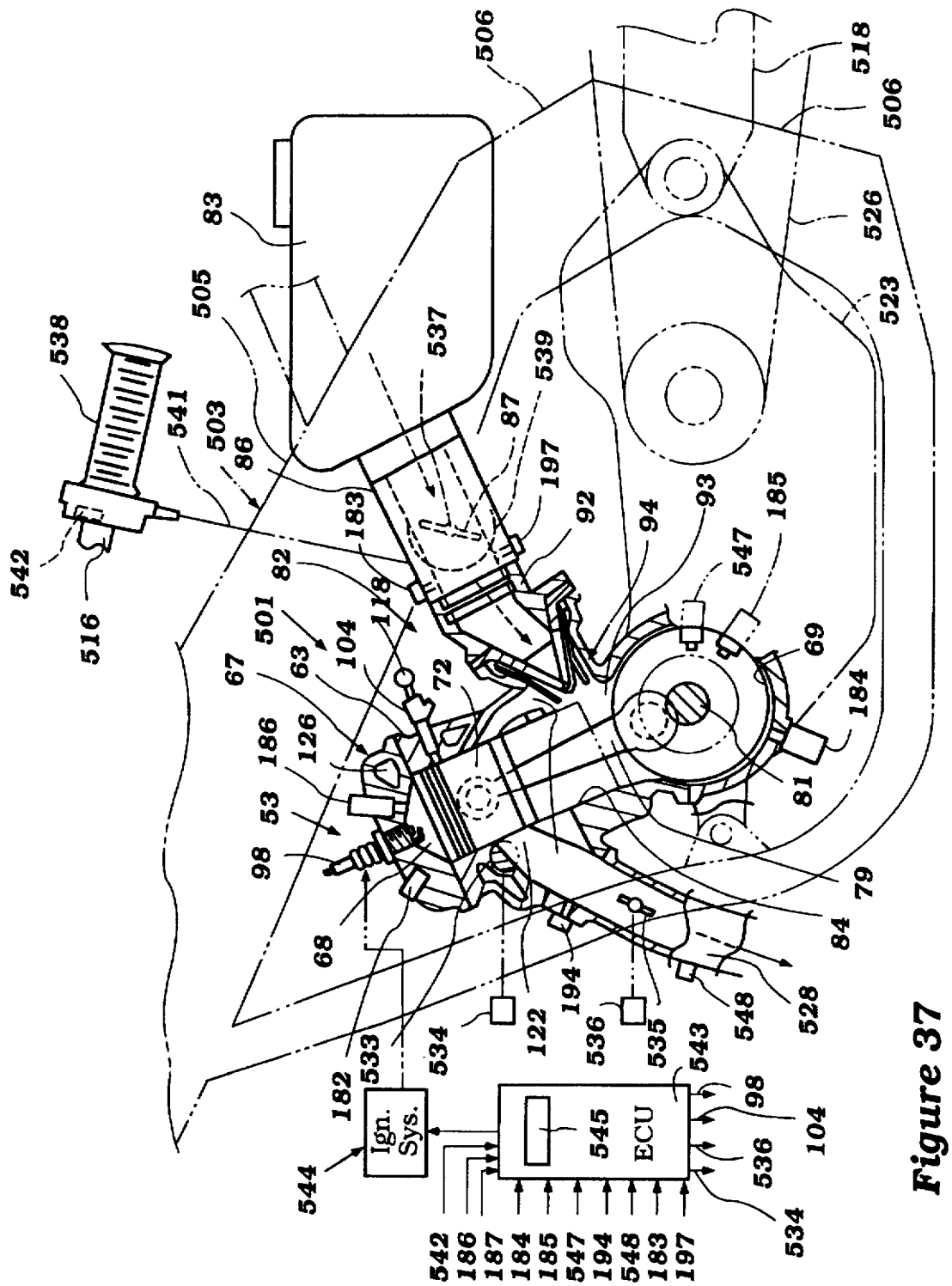
FIG. 37 is a view looking in the same direction as FIG. 36, but taken on a larger scale, showing the engine broken away and in part in section and also shows some of the association components schematically and others in phantom.

As may be seen in FIG. 37, the internal components of the engine are as previously described and where that is the case, they have been identified by the same reference numerals as utilized in conjunction with the description of the engine 501. Additional components, to be described later, are also employed and these will also be described later by reference to FIG. 37.

The exhaust system for the engine 501 is also different from that utilized with an outboard motor, the embodiments previously described. The exhaust system is basically conventional and therefore will be described only generally. It includes an exhaust manifold 528 which collects the exhaust gases from the cylinder block exhaust ports 122, but which formed externally of the cylinder block 63 unlike the outboard motor application. The exhaust gases are delivered from the exhaust manifold 528 to an expansion chamber device 529 and which may include a catalytic convertor including a three-way catalyst. The exhaust gases are then transferred to a muffler 531 which has a tailpipe 532 of relatively short length for discharge of the exhaust gases to the atmosphere.

From the foregoing description is should be readily apparent that the earlier description of the application for the engine is of a type that may be well known in the art. For the same reasons as previously described, therefore, further details of the construction of the motorcycle and engine 501, except in so far as they relate to the construction and operation of the invention, will be left to those skilled in the art who should have no difficulty in practicing the invention from this description.

Referring now in detail to FIG. 37, the internal components of the engine 501 will be described, but only in so far as they differ from those of the previously described embodiments. Basically although the layout may be different, the components are the same and where that is the case they have been identified by the same reference numerals and will not be described again.

In conjunction with this application, however, each of the exhaust ports 122 is provided with an exhaust control valve, indicated generally by the reference numeral 533 which is disposed in conjunction with the exhaust ports 122 and is configured and operated by a servo-motor 534 in such a way as to change the effective compression ratio of the engine 501. This is done by changing the exhaust port opening and closing timing in a manner as is well known in this art. This feature may be utilized in conjunction with the fuel injection strategy since because the exhaust port timing is changed, the injection timing can be changed to take advantage of the changed exhaust port timing.

As has been described in conjunction to reference to FIG. 12, the injection end limit is set primarily by the point at which the fuel injector 104 is masked by the movement of the pistons 72. However, the timing of closing of the exhaust port is also significant in controlling the timing of fuel injection. Therefore, if the timing of closing of the exhaust port is advanced, the timing of the end of fuel injection can also be advanced.

In addition to the exhaust timing control valve 533, there may be provided in the exhaust manifold 528 or in some other component of the exhaust discharge system, an exhaust control valve 535. The exhaust control valve 535 is opened and closed so as to control pressure pulses feedback to the engine through the exhaust system. Again, this type of device is known in the art. The exhaust control valve 535 is controlled by a servo-motor 536 in conjunction with any desired strategy.

The drawings also show the manner in which the throttle valves 87 are controlled in more detail than the previously embodiment. Like the previous embodiment, the throttle valves 87 are fixed to a throttle valve shaft, indicated by the reference numeral 537, which is journaled in the throttle body 86 in a known manner. However, a twist grip throttle control 538 is mounted on one of the handlebars 516 and is connected to a pulley 539 affixed to one end of the throttle valve shaft 537 by means of a wire actuator 541.

Rather than employing a throttle position sensor such as the sensor 182 in the previous embodiment, a throttle actuator sensor 542 may be employed in this embodiment to supply a control signal to the ECU, which is indicated in this embodiment by the reference numeral 543. A different reference numeral is utilized for the designation of the ECU in this embodiment merely because it controls additional functions such as the operation of the exhaust control servo-motor 534, the exhaust control valve servo-motor 536, as well as the firing of the spark plugs 98 by an ignition system shown schematically in this figure and indicated by the reference numeral 543.

Figure 38:
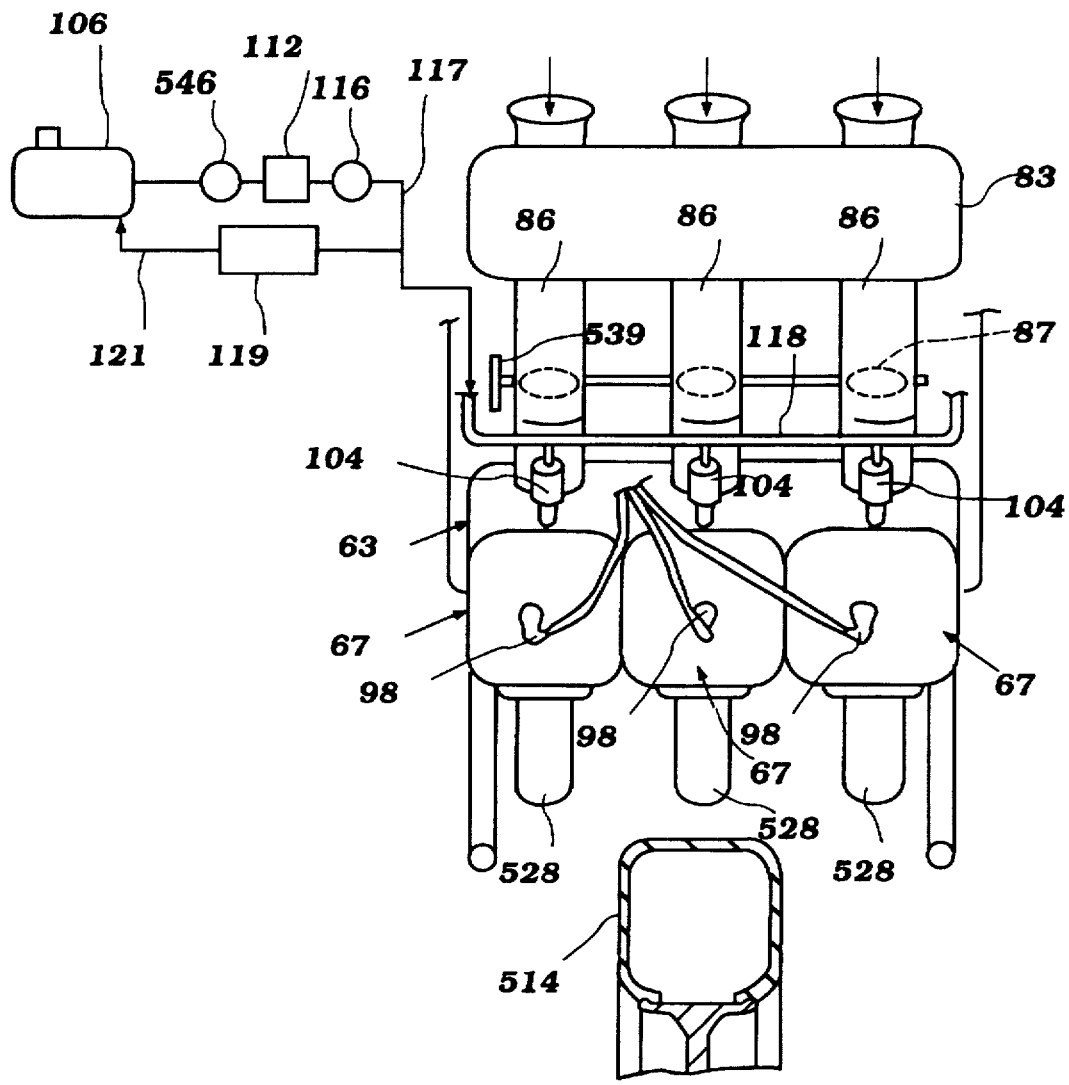
FIG. 38 is a view of the engine looking generally in the direction of the arrow 38 in FIG. 37.
Figure 39:
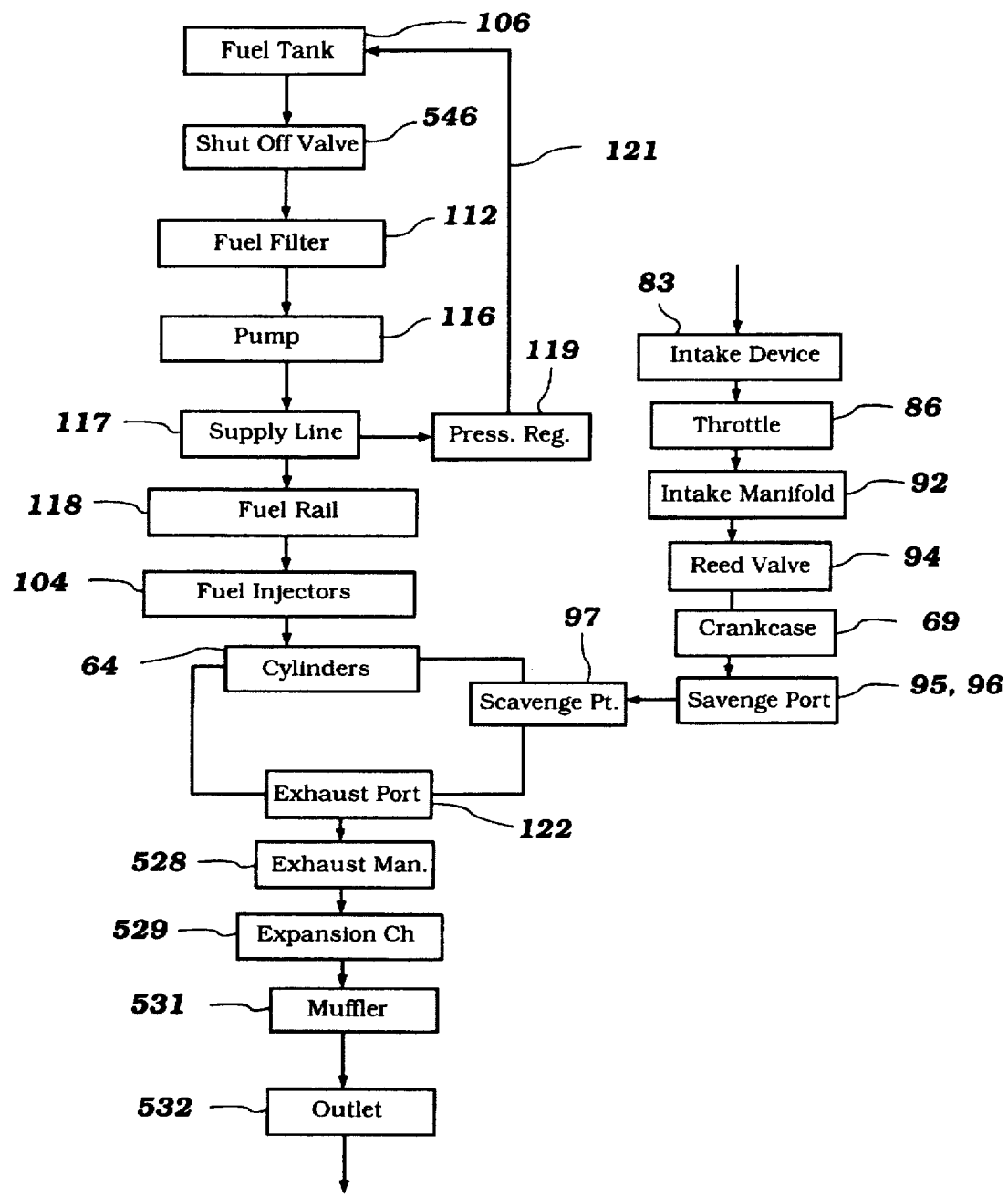
FIG. 39 is a schematic view showing the components of fuel injection and induction system of this embodiment.

As may be seen in FIGS. 38 and 39, the fuel supply system for supplying fuel to the fuel injectors 104 differs in two regards from the outboard motor system. In this embodiment, there is no vapor separator. However, there is a main fuel shut-off valve, indicated by the reference numeral 546, which is interposed between the fuel tank 106 and a fuel filter 112. From the fuel filter, fuel is supplied to the high pressure pump 116 and then through the supply conduit 117 to the fuel rail 118. In this environment, the fuel rail runs transversely along the upper side of the engine between the cylinder block 63 and the engine induction system.

The ECU 543 has a CPU 544 that receives the various input signals as with the previously described embodiment plus some additional input signals, as will now be described. These input signals are then utilized to control the engine and specifically the ignition system 544 and the other components already described.

In this embodiment, there are certain additional sensors and these include an actual crankcase speed sensor 547 which is provided in addition to the crank angle sensor 185. There is also provided in the exhaust manifold 538, an exhaust temperature sensor 548. This temperature sensor is utilized in combination with the exhaust control valve 535 so as to tune the exhaust to optimum performance. In all other regards, the construction and operation of this embodiment is the same as that described and for this reason, further description of this embodiment is not believed to be necessary to permit those skilled in the art to practice the invention.

Figure 40:
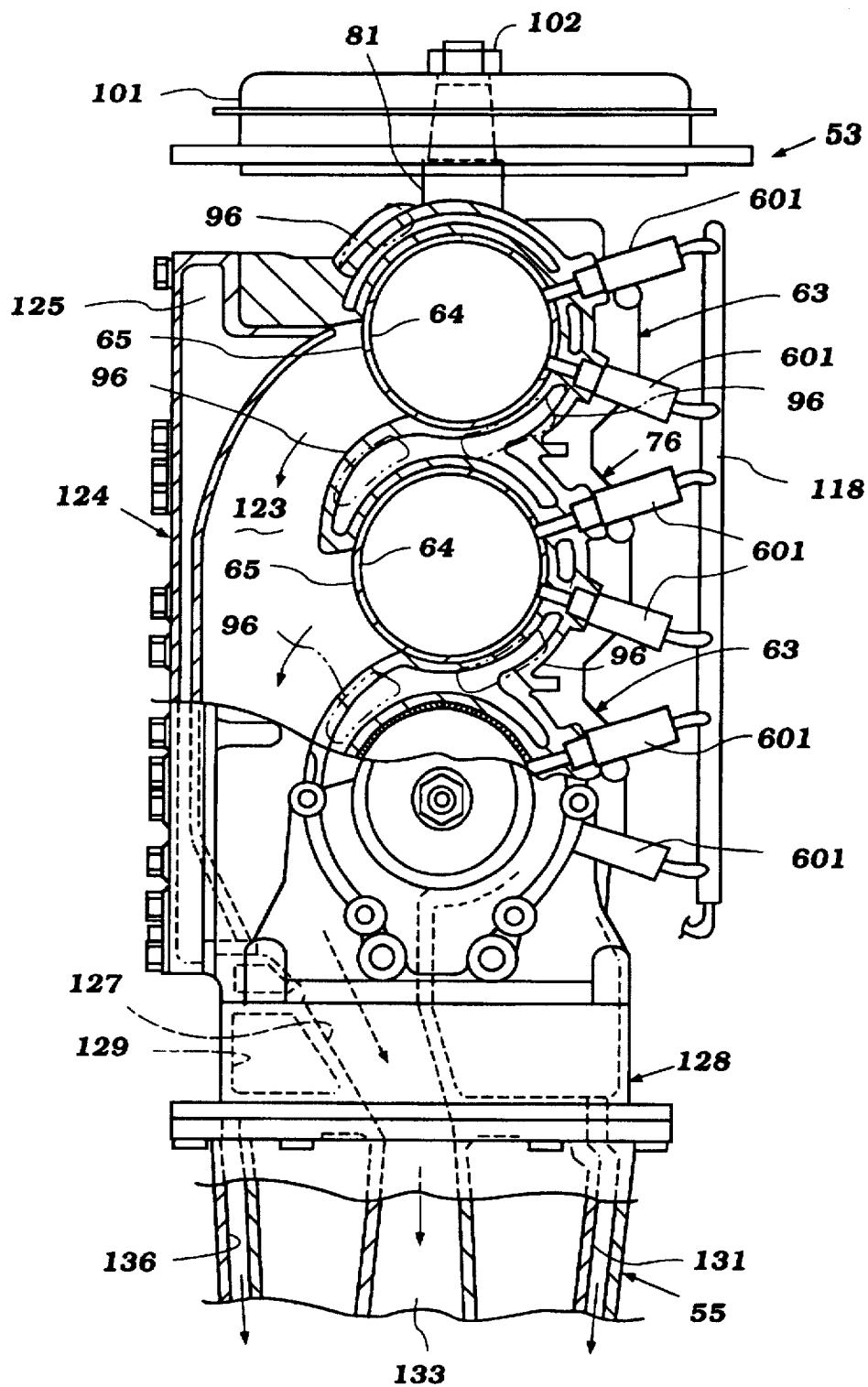
FIG. 40 is a cross-sectional view, in part similar to FIG. 4 and shows another embodiment of the invention applied to an outboard motor and using multiple fuel injectors.

In the embodiments are thus far described, the fuel injectors 104 have been capable of supplying all of the fuel required for running even at high load, high speed. This is because of the aforenoted placement of the fuel injectors 104 so they are protected from the combustion during the initial phases, but are opened later so that they can inject fuel for a sufficient duration. However, in addition to using a single fuel injector, it is possible to use two fuel injectors and FIG. 40 is a view corresponding to FIG. 4 and shows how two fuel injectors may be employed.

The two fuel injectors are positioned as aforenoted and are identified generally by the reference numeral 601. Aside of this and the fact that the fuel injectors 601 are both disposed on the opposite peripheral edges of the center scavenge passage 75 rather than directly over its center as with the previously described embodiments, this embodiment is the same as those previously described. Therefore, where components of this invention are the same as those already described, they have been identified by the same reference numerals and will not be described again.

Figure 41:
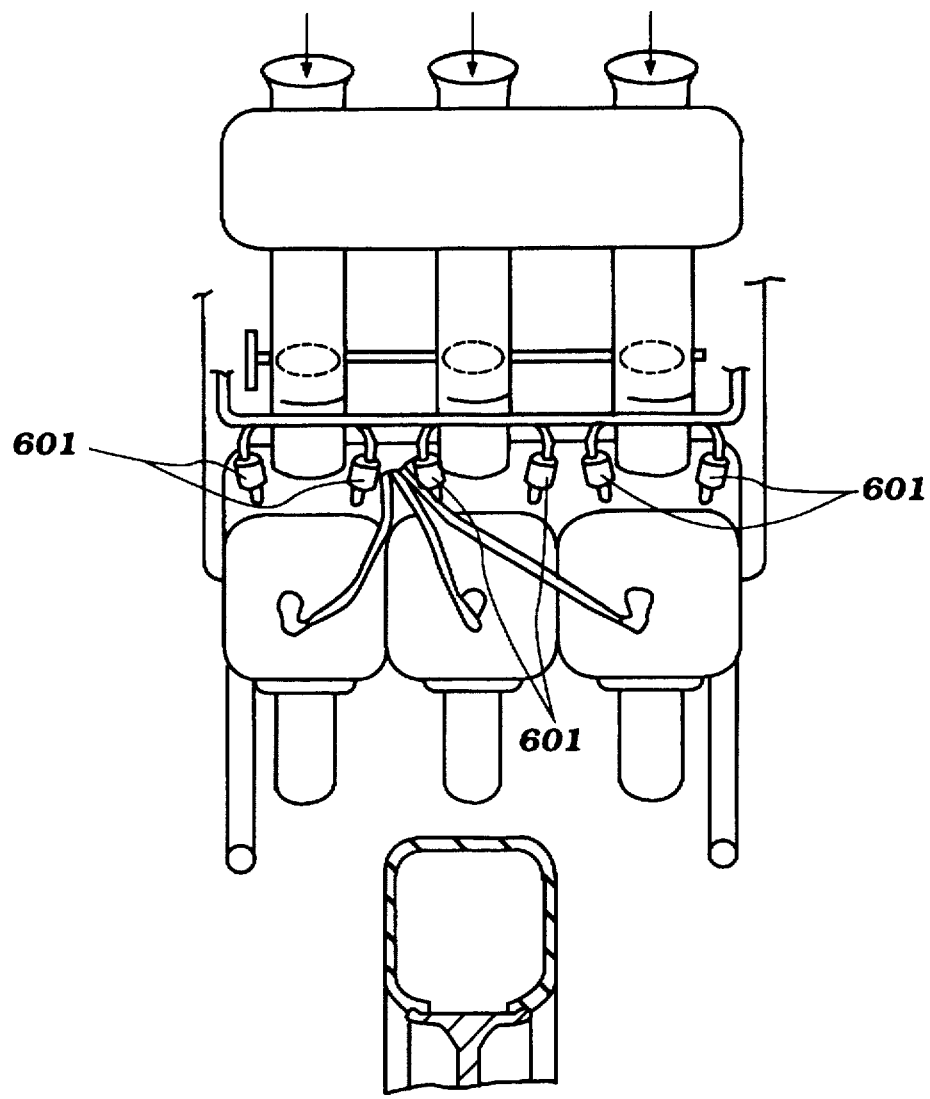
FIG. 41 is a view, in part similar to FIG. 38 and shows how multiple fuel injectors may be employed with a motorcycle-type application.

FIG. 41 is a view corresponding to FIG. 38 and shows how the dual fuel injector concept can be utilized with a motorcycle or other vehicle application. Again, the fuel injectors are identified by the reference numeral 601 and aside from this difference and their placement at the sides of the center scavenge passage 75 rather than directly over its center, the embodiment is the same as that previously described and therefore, components which are the same as the previous embodiment have been identified by the same reference numerals and will not be described again.

In the preamble of this application, it was noted that certain features of the invention may be utilized in conjunction with four cycle engines. Up until now, all of the embodiments illustrated and described have been that of two cycle engines although it should be obvious to those skilled in the art how the invention can be utilized with four cycle engines.

Figure 42:
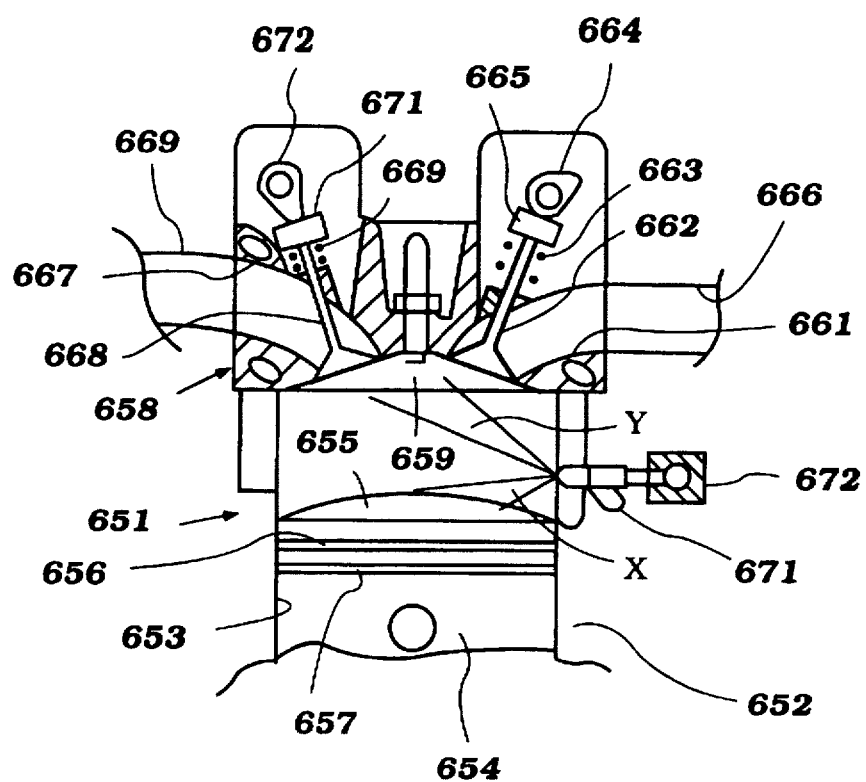
FIG. 42 is a partially schematic, cross-sectional view taken through a four-cycle internal combustion engine constructed in accordance with a further embodiment of the invention.

Nevertheless, next will be described, by reference to FIGS. 42 and FIG. 43, the application of the invention to a four cycle engine, shown partially and identified generally by the reference numeral 651. Since the construction of the basic engine may be of any conventional type, it has been shown generally schematically and will be described only generally. Where any details are described, they may be considered to be of any type known in the art.

The engine 651 includes a cylinder block 652 having cylinder bores 653. In the illustrated embodiment, the engine 651 is depicted as being of a three cylinder, in-line type or one bank of a V6 engine. As with the previously described embodiments, those skilled in the art will readily understand how the invention can be employed with engines having various numbers of cylinders and various cylinder orientation.

Pistons 654 reciprocate in each of the cylinder bores 653. The pistons 654 have heads 655 that are formed with upper and lower ring grooves in which piston rings 656 and 657 are positioned for sealing with the cylinder bore 653 in a known manner.

A cylinder head assembly, indicated generally by the reference numeral 658, is affixed to the cylinder block 652 in a known manner. The cylinder head 658 has recesses 659 that cooperate with each of the cylinder bores 653 and the head 655 of the pistons 654 to form the variable volume chambers of the engine which function as the combustion chambers.

In the illustrated embodiment, the engine is depicted as being of the four valve per cylinder type and hence, it is provided with a pair of intake passages 661, each of which terminates in a valve seat that is valved by a poppet type intake valve 662. The intake valves 662 are urged to their closed positions by coil compression springs 663. An overhead mounted intake camshaft 664 is journaled in the cylinder head assembly 658 in any known manner and cooperates with thimble tappets 665 for opening the intake valves 662. The intake camshaft 664 is driven at one half crankshaft speed by any known type of camshaft drive.

An intake manifold, indicated by the reference numeral 666, is affixed to the intake side of the cylinder head 658 and supplies the cylinder head intake passages 661 with atmospheric air. This air is collected through an air inlet device of any known type and a throttle valve (not shown) is placed in the intake manifold for controlling the air flow to the engine 651 and, accordingly, its speed.

On the side of the cylinder head 658 opposite the intake passages 661, there are provided exhaust passages 667. These exhaust passages 667 emanate from valve seats which are controlled by poppet type exhaust valves 668. Coil compression springs 669 urge these poppet valves to their closed position. The valves are opened via thimble tappets 671 by means of an exhaust camshaft 672. Like the intake camshaft 664, the exhaust camshaft 672 is driven at one half crankshaft speed by any suitable timing drive. An exhaust manifold 669 collects the exhaust gases from the exhaust passages 667 and discharges them to the atmosphere through any suitable type of exhaust system.

As with the two cycle embodiments, fuel injectors, indicated generally by the reference numerals 671, are mounted in the cylinder bore 653 of the cylinder block 652 in a relation relative to the stroke of the piston 654 as with the previously described embodiments. The fuel injectors 671 may have spray patterns of the type previously described and include at least a component Y which is of the lesser amount and which sprays toward the cylinder head recess 657. In addition, there is a larger spray component X that is directed toward the head of the piston 655 in the manner previously described.

Figure 43:
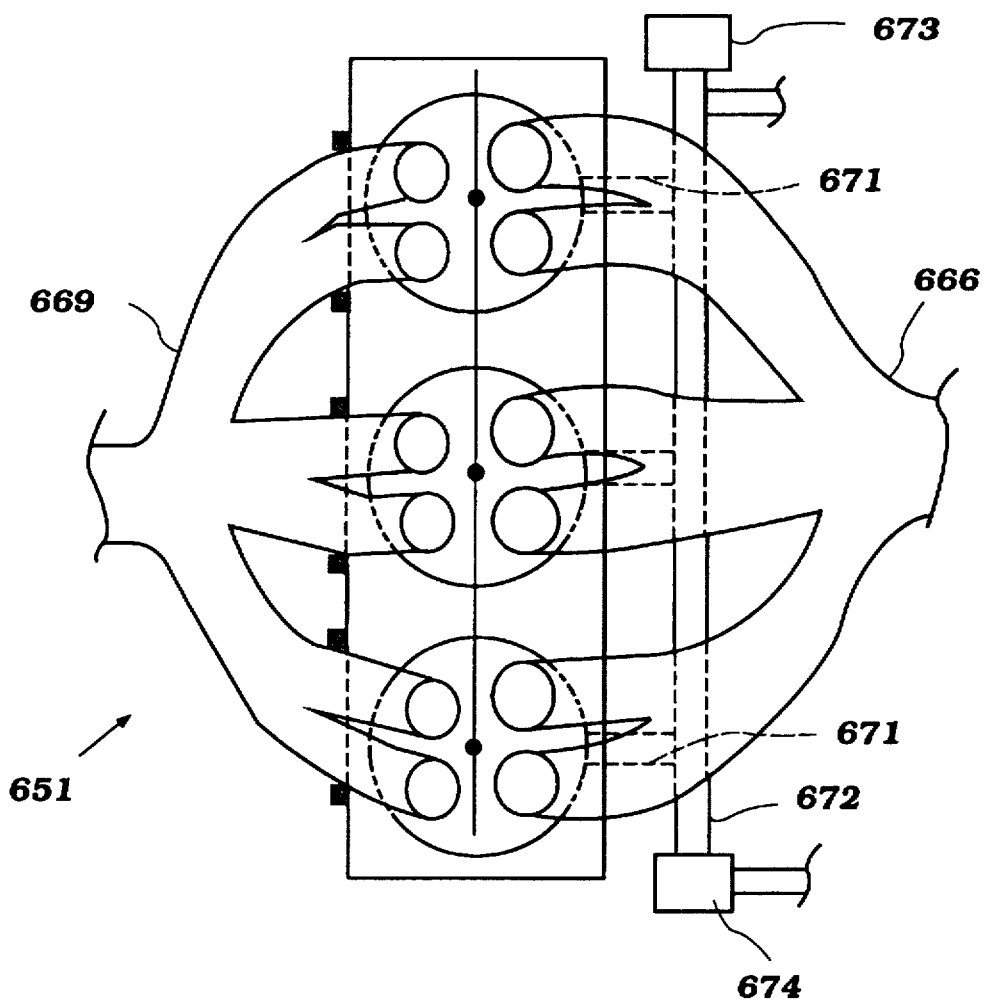
FIG. 43 is a partially schematic top plan view of the engine shown in FIG. 42 and depicts the fuel supply system for supplying fuel to the injectors, among other things.

The fuel supply system is not shown in full detail but it includes a fuel rail 672 that receives fuel from a fuel source under high pressure as shown by the arrow in FIG. 43. A pressure damper 673 is interposed in the fuel rail 67 at the inlet side to dampen pressure fluctuations. This may constitute an accumulator type of device. In addition, a pressure control valve 674 is positioned at the remote end of the fuel rail 672 and controls maximum pressure in the fuel rail by dumping the excess back to the fuel tank as shown by the arrow in this figure.

Thus, from the foregoing description, it should be readily apparent that the described embodiments of the invention are very effective in providing in-cylinder fuel injection with a low cost relatively low pressure fuel injector. In addition, the position of the injector to be protected by the piston does not interfere with its ability to spray adequate fuel for all running conditions. The spray patter is also such that a stratified charge may be formed in the combustion chamber and full combustion of fuel will result under all running conditions. Of course, the foregoing description is that of preferred embodiments of the invention and various changes and modifications may be made without departing from the spirit and scope of the invention, as defined by the appended claims.

What is claimed is:

1. A direct cylinder injected internal combustion engine comprised of a cylinder block having a cylinder bore extending from an upper peripheral edge closed by a cylinder head, a piston reciprocating in said cylinder bore between a bottom dead center (BDC) position and a top dead center (TDC) position and forming with said cylinder bore and cylinder head a variable volume combustion chamber, said piston having a piston head facing said cylinder head and at least an upper ring groove extending circumferentially therearound and receiving a piston ring, the distance between said piston at said BDC position and the upper peripheral edge of said cylinder bore being expressed as the dimension L, the distance between the lower end of said ring groove and said upper peripheral edge of said cylinder head when said piston is at said TDC position being expressed by the dimension RS, a fuel injector supported within said cylinder block and having a nozzle having a spray axis extending transversely into said cylinder bore, said spray axis laying at a distance A from said cylinder bore upper peripheral edge and such that said spray axis is covered by said piston during at least a portion of its stroke, and the following relationship is true:

$$RS<A<0.3L.$$

2. A direct cylinder injected internal combustion engine as set forth in claim 1 wherein the engine operates on a two cycle, crankcase compression principle and further including at least one scavenge passage opening into said cylinder bore through a scavenge port and at least one exhaust passage opening into said cylinder bore through an exhaust port.

3. A direct cylinder injected internal combustion engine as set forth in claim 2 wherein the upper peripheral edge of the exhaust port is spaced a distance ES from the upper peripheral edge of the cylinder bore and wherein the following relationship exists:

$$0.35ES<A<0.065ES.$$

4. A direct cylinder injected internal combustion engine as set forth in claim 2 wherein the fuel injector is disposed between the upper peripheral edge of the scavenge port and the upper peripheral edge of the cylinder bore.

5. A direct cylinder injected internal combustion engine as set forth in claim 4 wherein the fuel injector axis is disposed centrally over the scavenge port.

6. A direct cylinder injected internal combustion engine as set forth in claim 5 wherein the exhaust port is disposed diametrically opposite the scavenge port.

7. A direct cylinder injected internal combustion engine as set forth in claim 6 further including a pair of additional scavenge ports each served by a respective scavenge passage and disposed between the first mentioned scavenge port and the exhaust port.

8. A direct cylinder injected internal combustion engine as set forth in claim 7 wherein the upper peripheral edge of the exhaust port is spaced a distance ES from the upper peripheral edge of the cylinder bore and wherein the following relationship exists:

$$0.35ES < A < 0.065ES.$$

9. A direct cylinder injected internal combustion engine as set forth in claim 1 wherein the spray nozzle is configured to direct a portion of the fuel flowing therefrom downwardly toward the head of said piston and another portion in a direction generally above said spray axis and toward said cylinder head.

10. A direct cylinder injected internal combustion engine as set forth in claim 9 wherein the upwardly directed spray from the fuel injector has a lesser volume than the portion of the spray directed toward the head of the piston.

11. A direct cylinder injected internal combustion engine as set forth in claim 10 wherein the spray from the fuel injector extends through an arc in the direction of the axis of the cylinder bore that is greater than 45°.

12. A direct cylinder injected internal combustion engine as set forth in claim 11 wherein the arc is about 100°.

13. A direct cylinder injected internal combustion engine as set forth in claim 9 wherein the spray from the spray nozzle is formed in two distinct and separate portions, one extending above the injector nozzle axis and the other extending below the injector nozzle axis.

14. A direct cylinder injected internal combustion engine as set forth in claim 13 wherein the upwardly directed spray from the fuel injector has a lesser volume than the portion of the spray directed toward the head of the piston.

15. A direct cylinder injected internal combustion engine as set forth in claim 14 wherein the lowermost spray is configured so as to spray more fuel toward the side of the piston head beneath the fuel injector then on the other side.

16. A direct cylinder injected internal combustion engine as set forth in claim 15 wherein the spray from the fuel injector extends through an arc in the direction of the axis of the cylinder bore that is greater than 45°.

17. A direct cylinder injected internal combustion engine as set forth in claim 16 wherein the arc is about 100°.

18. A direct cylinder injected internal combustion engine as set forth in claim 1 wherein the spray nozzle sprays in a generally conical pattern within said cylinder bore and extending through an arc in the direction of the piston axis of greater than 45°.

19. A direct cylinder injected internal combustion engine as set forth in claim 18 wherein the arc is about 100°.

20. A direct cylinder injected internal combustion engine as set forth in claim 1 wherein the engine operates on a four cycle principle.

21. A direct cylinder injected internal combustion engine comprised a cylinder block having a cylinder bore extending from an upper peripheral edge closed by a cylinder head, a piston reciprocating in said cylinder bore between a bottom dead center (BDC) position and a top dead center (TDC) position and forming with said cylinder bore and said cylinder head a variable volume chamber, a fuel injector supported within said cylinder block and having a nozzle portion defining a spray axis extending into said cylinder bore and transversely thereacross, said spray nozzle being configured to direct a portion of the fuel flowing therefrom generally toward the axis of said cylinder bore and downwardly toward the head of said piston and another portion in a direction generally above said spray axis and toward the axis of said cylinder bore and toward said cylinder head.

22. A direct cylinder injected internal combustion engine as set forth in claim 21 wherein the upwardly directed spray from the fuel injector has a lesser volume than the portion of the spray directed toward the head of the piston.

23. A direct cylinder injected internal combustion engine as set forth in claim 21 wherein the spray from the fuel injector extends through an arc in the direction of the axis of the cylinder bore that is greater than 45°.

24. A direct cylinder injected internal combustion engine as set forth in claim 23 wherein the arc is about 100°.

25. A direct cylinder injected internal combustion engine as set forth in claim 21 wherein the spray from the spray nozzle is formed in two distinct and separate portions, one extending above the injector nozzle axis and the other extending below the injector nozzle axis.

26. A direct cylinder injected internal combustion engine as set forth in claim 25 wherein the upwardly directed spray from the fuel injector has a lesser volume than the portion of the spray directed toward the head of the piston.

27. A direct cylinder injected internal combustion engine as set forth in claim 26 wherein the lowermost spray is configured so as to spray more fuel toward the side of the piston head beneath the fuel injector then on the other side.

28. A direct cylinder injected internal combustion engine as set forth in claim 27 wherein the spray from the fuel injector extends through an arc in the direction of the axis of the cylinder bore that is greater than 45°.

29. A direct cylinder injected internal combustion engine as set forth in claim 28 wherein the arc is about 100°.

30. A direct cylinder injected internal combustion engine as set forth in claim 21 wherein the engine operates on a two cycle, crankcase compression principle and further including at least one scavenge passage opening into said cylinder bore through a scavenge port and at least one exhaust passage opening into said cylinder bore through an exhaust port.

31. A direct cylinder injected internal combustion engine as set forth in claim 30 wherein the fuel injector is disposed between the upper peripheral edge of the scavenge port and the upper peripheral edge of the cylinder bore.

32. A direct cylinder injected internal combustion engine as set forth in claim 31 wherein the fuel injector axis is disposed centrally over the scavenge port.

33. A direct cylinder injected internal combustion engine as set forth in claim 32 wherein the exhaust port is disposed diametrically opposite the scavenge port.

34. A direct cylinder injected internal combustion engine comprised a cylinder block having a cylinder bore extending from an upper peripheral edge closed by a cylinder head, a piston reciprocating in said cylinder bore between a bottom dead center (BDC) position and a top dead center (TDC) position and forming with said cylinder bore and said cylinder head a variable volume chamber, a fuel injector supported within said cylinder block and having a nozzle portion defining a spray axis extending into said cylinder bore and transversely thereacross and defined by only two spray paths, one of said spray paths of said spray nozzle being configured to direct a portion of the fuel flowing therefrom downwardly toward the head of said piston and the other of said spray paths directing another portion of the injected fuel in a direction generally above said spray axis and toward said cylinder head, said spray nozzle spraying in a generally conical pattern within said cylinder bore and extending through an arc in the direction of the piston axis of greater than 45°.

35. A direct cylinder injected internal combustion engine as set forth in claim 34 wherein the arc is about 100°.

* * * * *